(12) United States Patent
Lyuboshenko

(10) Patent No.: US 10,768,400 B2
(45) Date of Patent: Sep. 8, 2020

(54) VARYING AN ILLUMINATION PATH OF A SELECTIVE PLANE ILLUMINATION MICROSCOPY

(71) Applicant: Igor Lyuboshenko, Le Plessis-Robinson (FR)

(72) Inventor: Igor Lyuboshenko, Le Plessis-Robinson (FR)

( * ) Notice: Subject to any disclaimer, the term of this patent is extended or adjusted under 35 U.S.C. 154(b) by 101 days.

(21) Appl. No.: 15/944,485

(22) Filed: Apr. 3, 2018

(65) Prior Publication Data

US 2018/0364467 A1    Dec. 20, 2018

Related U.S. Application Data

(63) Continuation-in-part of application No. 15/680,075, filed on Aug. 17, 2017, now Pat. No. 10,365,464.

(Continued)

(51) Int. Cl.
*G02B 21/00* (2006.01)
*G02B 21/06* (2006.01)
(Continued)

(52) U.S. Cl.
CPC ......... *G02B 21/06* (2013.01); *G01N 21/6458* (2013.01); *G02B 21/0032* (2013.01);
(Continued)

(58) Field of Classification Search
CPC .. G02B 21/00; G02B 21/0004; G02B 21/002; G02B 21/0024; G02B 21/0032;
(Continued)

(56) References Cited

U.S. PATENT DOCUMENTS 7,554,725 B2   6/2009 Stelzer
7,787,179 B2   8/2010 Lippert
(Continued)

FOREIGN PATENT DOCUMENTS

WO    2016166151        10/2016
WO    20160178856 W     11/2016
(Continued)

OTHER PUBLICATIONS

Chmielewski et al., "Fast imaging of live organisms with sculpted light sheets", Scientific Reports, Apr. 20, 2015.
(Continued)

*Primary Examiner* — Arnel C Lavarias
(74) *Attorney, Agent, or Firm* — Van Pelt, Yi & James LLP

(57) ABSTRACT

A system for illuminating a microscopy specimen includes an illumination source configured to emit a light that travels along an illumination path to illuminate the microscopy specimen placed on an optical detection path of an optical microscope. The system also includes optical elements in the illumination path and configured to at least in part transform the light from the illumination source into a light sheet illuminating the microscopy specimen. The optical elements include an electronically tunable lens configured to vary a focal distance of the electronically tunable lens to dynamically vary a position of a waist of the light sheet illuminating the microscopy specimen. The optical elements include a deflector configured to vertically move the light sheet to illuminate the microscopy specimen at different horizontal planes.

20 Claims, 28 Drawing Sheets

Related U.S. Application Data

(60) Provisional application No. 62/489,168, filed on Apr. 24, 2017, provisional application No. 62/556,093, filed on Sep. 8, 2017.

(51) Int. Cl.
*G01N 21/64* (2006.01)
*G02B 21/26* (2006.01)

(52) U.S. Cl.
CPC ..... *G02B 21/0048* (2013.01); *G02B 21/0076* (2013.01); *G02B 21/26* (2013.01)

(58) Field of Classification Search
CPC ............ G02B 21/0036; G02B 21/0052; G02B 21/006; G02B 21/0076; G02B 21/06; G02B 21/082; G02B 21/086; G02B 21/088; G02B 21/16; G02B 21/18; G02B 21/24; G02B 21/36; G02B 21/361
USPC ....... 359/362, 363, 368, 369, 381, 385, 388, 359/390
See application file for complete search history.

(56) References Cited

U.S. PATENT DOCUMENTS

| | | | |
|---|---|---|---|
| 8,482,854 | B2 | 7/2013 | Lippert |
| 8,699,133 | B2 | 4/2014 | Lippert |
| RE45,575 | E | 6/2015 | Lippert |
| 9,316,824 | B2 | 4/2016 | Shroff |
| 9,404,869 | B2 | 8/2016 | Keller |
| 9,423,601 | B2 | 8/2016 | Toda |
| 9,587,213 | B2 | 3/2017 | Morgan |
| 10,007,100 | B2 * | 6/2018 | Kikuchi ............ G02B 21/0048 |
| 2012/0282667 | A1 | 11/2012 | Lippert |
| 2014/0202265 | A1 | 7/2014 | Hellmich |
| 2015/0098126 | A1 | 4/2015 | Keller |
| 2016/0214107 | A1 | 7/2016 | Viasnoff |
| 2016/0241758 | A1 | 8/2016 | Dohi |
| 2018/0164569 | A1 | 6/2018 | Brinkman |
| 2018/0275389 | A1 | 9/2018 | Shepherd |

FOREIGN PATENT DOCUMENTS

| | | |
|---|---|---|
| WO | 2017062741 A1 | 4/2017 |
| WO | 2018033581 | 2/2018 |

OTHER PUBLICATIONS

Fahrbach et al., "Rapid 3D light-sheet microscopy with a tunable lens", Optics Express, vol. 21, No. 18, p. 21010-21026, Aug. 30, 2013.

Hedde et al., "Selective plane illumination microscopy with a light sheet of uniform thickness formed by an electrically tunable lens", from Microscopy research and technique, Jun. 24, 2016.

Hedde et al., "sideSPIM—selective plane illumination based on a conventional inverted microscope", from Biomedical Optics Express, vol. 8, No. 9, p. 3918-3937, Aug. 1, 2017.

Chhetri et al: "Whole-animal functional and developmental imaging with isotropic spatial resolution", Nature Methods. vol. 12. No. 12. Dec. 1, 2015 (Dec. 1, 2015). pp. 1171-1178. XP055611986. New York, ISSN: 1548-7091. DOI: 10.1038/nmeth.3632.

De Medeiros et al: "Confocal multiview light-sheet microscopy", Nature Communications, vol • 6. No. 1. Nov. 25, 2015 (Nov. 25, 2015). XP055587306. DOI: 10.1038/ncomms9881, p. 4.

Power et al: "A guide to light-sheet fluorescence microscopy for multiscale imaging", Nature Methods, vol. 14, No. 4, Apr. 1, 2017 (Apr. 1, 2017), pp. 360-373, XP055536560, New York, ISSN: 1548-7091, DOI: 18.1038/nmeth.4224, p. 367.

Yang et al: "Dual-slit confocal light sheet microscopy for in vivo whole-brain imaging of zebrafish", Biomedical Optics Express, vol. 6, No. 5, May 1, 2015 (May 1, 2015), p. 1797, XP055514896, United States, SSN: 2156-7085, DOI: 10.1364/BOE.6.001797.

Dean et al., Deconvolution-Free Subcellular Imaging with Axially Swept Light Sheet Microscopy, Biophysical Journal, vol. 108, Jun. 2015, pp. 2807-2815.

Dean et al., Diagonally Scanned Light-Sheet Microscopy for Fast Volumetric Imaging of Adherent Cells, Biophysical Journal 110, Biophysical Society, Mar. 29, 2016, pp. 1456-1465.

Dean et al., Uniform and Scalable Light-Sheets Generated by Extended Focusing, Department of Cell Biology, University of Texas Southwestern Medicate Center, Optics Express, vol. 22, No. 21, Oct. 16, 2014.

Hedde et al., Selective Plane Illumination Microscopy with a Light Sheet of Uniform Thickness Formed by an Electrically Tunable Lens, Microscopy Research and Technique, Jun. 24, 2016.

Koho et al., Image Quality Ranking Method for Microscopy, Scientific Reports, Jul. 1, 2016.

Jan Huisken et al., "Selective Plane Illumination Microscopy", In: "Handbook of Biological Confocal Microscopy", Jan. 1, 2006, Springer, New York, NY. pp. 672-675.

Per Niklas Hedde et al. "Selective plane illumination microscopy with a light sheet of uniform thickness formed by an electrically tunable lens", Microscopy Research and Technique, vol. 81, No. 9, Jun. 24, 2016, pp. 924-928.

Adams et al. Light Sheet Fluorescence Microscopy (LSFM) in: "Current Protocols in Cytometry", pp. 12.37.1-12.37.15. Jan. 2015.

* cited by examiner

SECTION A-A

SECTION C-C

VARYING AN ILLUMINATION PATH OF A SELECTIVE PLANE ILLUMINATION MICROSCOPY

CROSS REFERENCE TO OTHER APPLICATIONS

This application is a continuation-in-part of co-pending U.S. patent application Ser. No. 15/680,075 entitled EXTENDING OPTICAL MICROSCOPES TO PROVIDE SELECTIVE PLANE ILLUMINATION MICROSCOPY filed Aug. 17, 2017, which claims priority to U.S. Provisional Patent Application No. 62/489,168 entitled EXTENDING OPTICAL MICROSCOPES TO PROVIDE SELECTIVE PLANE ILLUMINATION MICROSCOPY filed Apr. 24, 2017. This application claims priority to U.S. Provisional Patent Application No. 62/556,093 entitled OPTICAL ARRANGEMENT TO EXTEND OPTICAL MICROSCOPES TO PROVIDE 3D SELECTIVE PLANE ILLUMINATION MICROSCOPY filed Sep. 8, 2017. All of the above-referenced applications are incorporated herein by reference for all purposes.

BACKGROUND OF THE INVENTION

Light sheet fluorescence microscopy or selective plane illumination microscopy (SPIM) technology typically relies on illuminating of a specimen in thin optical slices, formed from laser light, exciting the fluorophores in the specimen and acquiring light emitted by the illuminated plane inside the specimen. The direction in which the light is detected is typically perpendicular to the illuminated plane. The resolution of SPIM is often limited by the shape and properties of the light sheet illuminating the specimen.

With SPIM, the lateral resolution is determined by the detection objective lens and the axial resolution is related to the numerical aperture (NA) of the illumination objective. With higher NAs, the axial resolution is similar to confocal fluorescence microscopes. Images from light sheet microscopes exhibit a better signal-to-noise (S/N) ratio and a higher dynamic range than images produced by confocal fluorescence microscopes. With low NAs, the axial resolution is determined by the thickness of the light sheet at its thinnest point (i.e., the waist), with an excellent isotropic Point Spread Function. However, while the axial resolution increases only linearly with increasing NA, the field of view (i.e., FOV) with optimal axial resolution decreases with the square of the NA. This relation results in a fundamental design problem, where a large FOV is not compatible with high axial resolution. Therefore, there is a need for an illumination system that produces the thinnest possible light sheet illumination over the largest possible field of view.

BRIEF DESCRIPTION OF THE DRAWINGS

Various embodiments of the invention are disclosed in the following detailed description and the accompanying drawings.

DETAILED DESCRIPTION

Figure 1A:
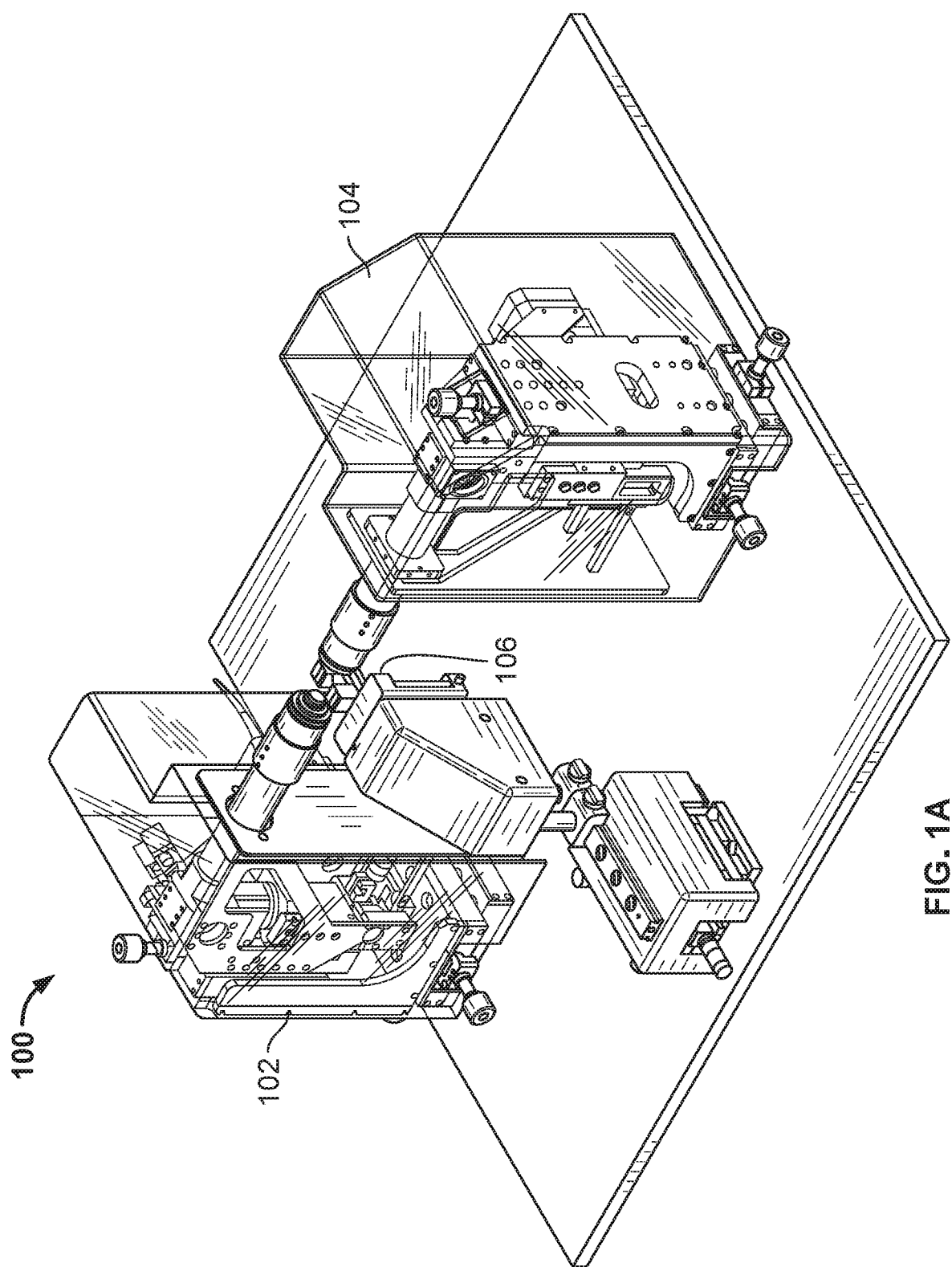
FIG. 1A is a diagram illustrating an embodiment of components of a system that can be coupled to a microscope to convert the microscope to perform SPIM.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

High spatial and temporal resolution for three-dimensional light sheet imaging is critical for the understanding of physiological processes of living specimens while keeping them in their natural state without perturbation. The typical methods based on mechanical motion control for volume acquisition introduce vibrations during the acquisition and limit the scanning speed. As water-dipping objectives are customarily used for observation of biologic specimens in the specimens' natural medium, perturbations from a moving detection objective may influence the specimen behavior under observation and restrain the scope of application for dynamic studies. Larger specimens can also exceed the laser waist (focus) area and reduce the optical sectioning power of the light sheet assembly.

Optical arrangements (e.g., serving as add-on attachments to various interfaces of an optical microscope) providing illumination for a three-dimensional selective plane lightsheet microscopy (SPIM) are disclosed. In some embodiments, these optical arrangements can dynamically vary: a cross section of a light sheet, a position of a waist of the light sheet along an axis of illumination, a position of the plane of the light sheet illumination, and/or a direction in which beam components extending within the light sheet are directed to the specimen. Additionally, a focus distance of a detection lens in an optical detection path of a microscope can also be dynamically and/or automatically varied and synchronized with the dynamic variance of the light sheet illumination to increase the resolution of a detected image of the SPIM specimen.

Typical SPIM solutions are offered as stand-alone digital systems with a far different operating approach than conventional optical microscopy. Using traditional SPIM microscopes requires special training and imposes new behaviors upon the users, thus minimizing their productivity and limiting the market penetration and scientific community's awareness of advantages offered by the light sheet technology. In some embodiments, a vertical optical microscope (e.g., upright or inverted microscope) is converted to provide selective plane illumination microscopy. For example, by adding components to a traditional vertical optical microscope to convert it to provide selective plane illumination microscopy, cost savings and reduced physical size footprint are achieved as compared to using a traditional dedicated standalone SPIM microscope. For example, a typical lab setting already includes a traditional vertical optical microscope and allowing the traditional vertical optical microscope to be converted to an SPIM microscope saves costs and space. An illumination source is configured to generate a light sheet along a longitudinal axis to illuminate a specimen placed in a vertical optical detection axis of the vertical optical microscope. The illumination source is configured to generate a light sheet along a longitudinal axis that is substantially perpendicular to a vertical optical detection axis of the vertical optical microscope and the illumination source is configured to produce an excitation at a plane in the specimen that generates fluorescent emissions. A detection sensor is placed in the detection optical path of the vertical optical detection axis of the vertical optical microscope. The detection sensor is configured to detect the fluorescent emissions to provide selective plane illumination microscopy.

Typical standalone SPIM microscopes are configured in a horizontal orientation. For example, both the illumination path and the detection path are oriented horizontally (e.g., in the horizontal plane substantially perpendicular to the direction of gravity). For example, typical solutions include an excitation illumination source objective having the excitation illumination axis and the detection objective having the detection optical axis that are both engaged to the same mount body, where the two axes are oriented in a perpendicular relation to each other in the horizontal plane. This often is due to limitations in traditional specimen holding solutions. For example, SPIM is often utilized to observe biological specimens suspended in a fluid and limitations of how the specimen can be contained and rotated using traditional specimen holding solutions require the specimen to be illuminated and detected in the horizontal plane. However, the detection optical path of traditional vertical optical microscopes is in the vertical direction. Solutions described herein allow SPIM detection to be achieved using the vertical optical microscope's optical arrangement in the vertical direction.

In some embodiments, both observation and acquisition modes are added to the microscope detection objective's optical arrangement of vertical optical microscopes. By using the microscope stand of the vertical optical microscope as an integral part of the detection unit, it takes advantage of quality optical elements already present in the detection path (e.g., including objective turret, filter wheel, binoculars, and video port), thereby reducing complexity of building a selective plane illumination microscopy system. As no alterations to the detection path's optics of the vertical optical microscope are introduced, all other functionalities that could be necessary for other observation modes (e.g., transmission, wide field fluorescence, etc.) are kept unaltered, including convenient means for specific applications such as electrophysiology. Therefore it serves as an upgrade on existing microscopy platforms by adding light sheet imaging capabilities providing a cost effective solution or as a whole system by integrating a functional fluorescence microscope.

FIG. 1A is a diagram illustrating an embodiment of components of a system that can be coupled to a microscope to convert the microscope to perform SPIM. System 100 includes illumination units 102 and 104, and stepper stage 106.

Illumination units 102 and 104 are designed to work with a laser source (e.g., fiber laser source) to produce a light sheet using a cylindrical lens. This allows direct imaging of an optical section with a single frame at full camera resolution. For better illumination plane homogeneity across the specimen, two illumination units are used on both sides of a specimen to compensate the absorption effects with a thick specimen. In some embodiments, the light sheet is projected using an objective, which can be adapted according to specimen size and detection magnification. The illumination units are designed to compensate chromatic shift for the visible spectrum, thus allowing the simultaneous illumination at several wavelengths using a laser combiner for multi-fluorescence imaging. Although two illumination units are shown, a single or any other number of illumination units may be utilized in various other embodiments. In some embodiments, illumination units 102 and/or 104 produce a pencil beam rather than or in addition to a light sheet.

Optical arrangements of illumination units 102 and/or 104 provide illumination for a three-dimensional selective plane light-sheet microscopy. In some embodiments, these optical arrangements can dynamically vary: a cross section of a light sheet, a position of a waist of the light sheet along an axis of illumination, a position of the plane of the light sheet illumination, and/or a direction in which beam components extending within the light sheet are directed to the specimen.

Stepper stage 106 includes a motorized translation stage to move the specimen through the illumination plane of illumination units 102 and 104. Thus, using stepper stage 106, the illumination sheet and the detection plane may remain in fixed positions while detecting various slices as the translation stage is moved in steps. The shown stepper stage 106 includes a support for a specimen chamber, a z-stage that is moveable in the vertical z-direction via a motor, a slider, and controls for x and y position adjustments of the stage in the horizontal plane. In some embodiments, a base configured to engage a specimen stage for supporting and orienting the specimen holder in an x-y direction is utilized. In some embodiments, a translational stage configured to engage the specimen holder in the z-direction is utilized.

Figure 1B:
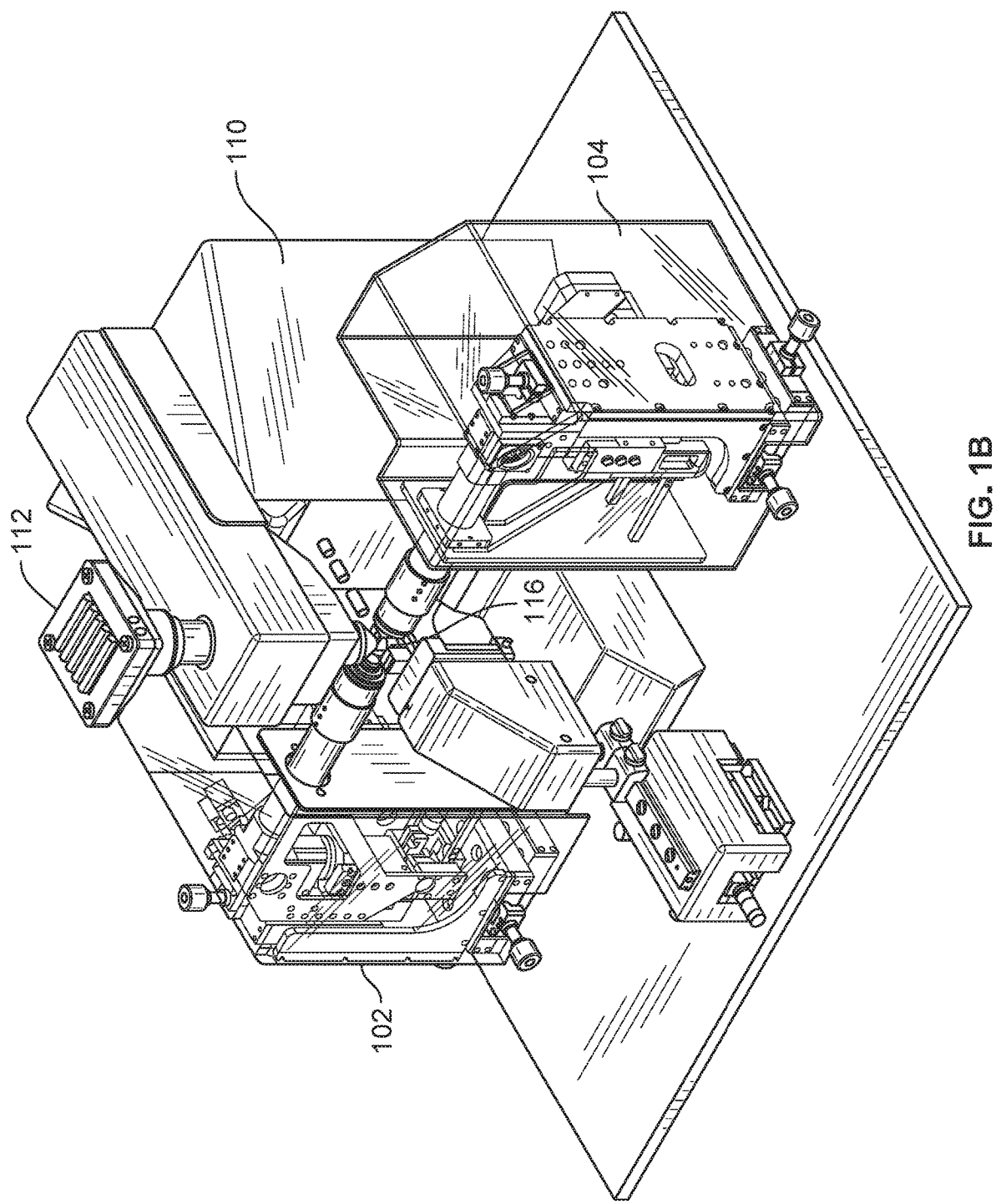
FIG. 1B is a diagram illustrating an embodiment showing an add-on system added to a vertical microscope to convert the vertical microscope to perform SPIM.

FIG. 1B is a diagram illustrating an embodiment showing an add-on system added to a vertical microscope to convert the vertical microscope to perform SPIM. For example, system 100 of FIG. 1A is shown engaged with vertical optical microscope 110. Vertical optical microscope 110 shown in this example is a trinocular fluorescence microscope equipped with a filter wheel and an objective turret with a water dipping/immersion detection lens. However in various other embodiments, other types of optical microscopes may be utilized. The optical detection path utilized to perform SPIM may utilize standard components of microscope 110, including its components in the optical detection path (e.g., objective lenses, arm, filter in filter wheel, etc.). An output port of optical microscope 110 is coupled to detection unit 112 that is utilized to acquire the SPIM image detected using the optical detection path of microscope 110. For example, detection unit 112 includes a digital camera. In some embodiments, a focus distance of the optical detection path can be dynamically varied and synchronized with the dynamic variance of the light sheet illumination to increase the resolution of a detected image of the SPIM specimen.

Specimen chamber and holder assembly 116 has been configured to handle SPIM using a vertical optical detection path configuration as compared to traditional holders that have been designed to be utilized for horizontal optical SPIM detection paths. Specimen chamber and holder assembly 116 allows a specimen to be rotated about a substantially horizontal rotational axis and substantially perpendicular to the optical axis of the detection objective using a rotational drive or knob. For example, specimen chamber and holder assembly 116 embeds a specimen in a substantially rigid substantially transparent embedding compound maintained in an immersion liquid and placed in the holder, allowing the specimen to be rotated about the substantially horizontal rotational axis that is substantially perpendicular to the optical axis of the detection objective. In some embodiments, specimen chamber and holder assembly 116 is supported by a specimen stage for supporting and orienting assembly 116 in an x-y direction and/or a translational stage configured to engage the assembly 116 in the z-direction.

Figure 2:
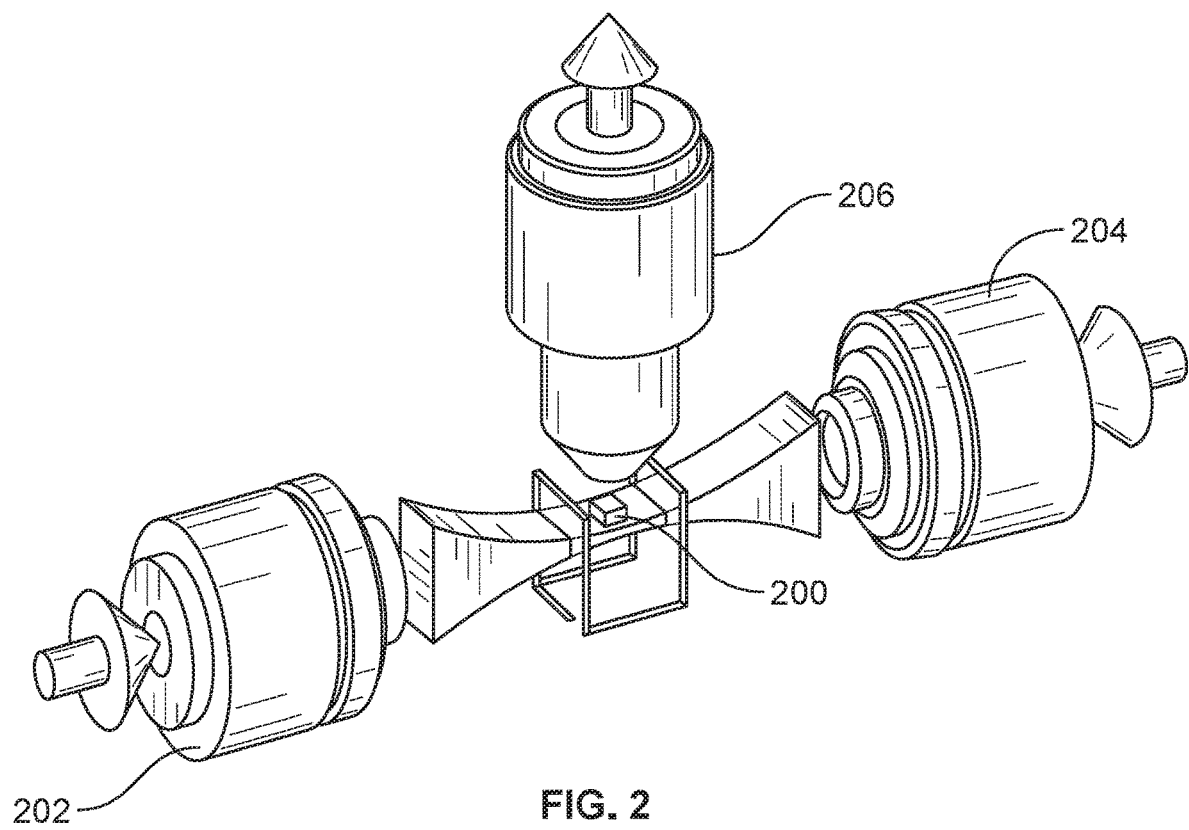
FIG. 2 is a diagram illustrating an example of illumination of a specimen.

FIG. 2 is a diagram illustrating an example of illumination of a specimen. In some embodiments, a light-sheet microscopy system uses a standard upright or inverted microscope, capable of illuminating a set of planes within a specimen, to detect the fluorescent emission coming from the illuminated plane, while at the same time producing the finest axial resolution at the largest region of interest. Specimen 200 is being illuminated by illumination objective 202 and illumination objective 204. The illuminated specimen is observed via optical detection objective 206. In some embodiments, detection objective 206 is a part of microscope 110, illumination objective 202 is a part of illumination unit 102, and illumination objective 204 is a part of illumination unit 104 of system 100 of FIGS. 1A and 1B. For example, the illumination units are designed to work with fibered laser sources to produce a light sheet using cylindrical lenses of the objectives. This allows direct imaging of an optical section with a single frame at full camera resolution. For better illumination plane homogeneity across the specimen, two illumination units are used on both sides of the specimen to compensate for the absorption effects of a thick specimen sample. In an alternative embodiment, a single illumination unit is utilized. In some embodiments, the light sheet is projected using finite-infinite objectives, which can be adapted according to specimen size and detection magnification. In some embodiments, the illumination output of the objectives has a cross section of an elongated ellipse due to an assembly of optical elements in which the thin sheet of light is generated from one or many laser light sources. In another embodiment, the illumination output of the objectives has a cross section of an elongated rectangle. Lenses of objectives 202 and 204 are designed to optically compensate chromatic shift for the visible spectrum, thus allowing the simultaneous illumination at several wavelengths using a laser combiner for multi-fluorescence imaging.

Illumination objectives 202 and 204 focus the laser light source to create a light sheet. However, as shown in FIG. 2, due to the focusing of the light source by the lens of the objective, the light sheet is thinner at the focal point area (i.e., at the "waist") and becomes thicker away from the focal point area. A thinner light sheet allows for better image resolution and thus a uniformly thin light sheet is desired. Given the effects of the shown divergence, a light sheet within a limited range of thickness can be utilized in order to maintain a desired image resolution, thus limiting the field of view to the area of the light sheet within the thickness limit. However in some cases it may be desirable to capture a specimen that is larger than the limited field of view. In some embodiments, a variable focus lens is utilized in illumination units to sweep the focal point across the specimen to create a thinner light sheet over a larger area of the light sheet. For example, focus distance of the illumination is automatically adjusted to move and sweep the focus across the specimen during image capture to automatically sweep the thinnest point of the light sheet across the specimen. By using a lens of variable focal distance in the illumination path of the optical arrangement, sweeping of the light sheet waist is made possible along the illumination direction. The lens of variable focal distance can vary between both negative and positive optical powers. This allows the acquisition of light sheet images of both the finest axial resolution and the largest field of view in one and the same frame.

By synchronizing lines of a rolling shutter of a detector (e.g., digital camera) with the sweeping position of the waist of the light sheet, a detected image of the specimen with a larger field of view can be generated without physically moving the specimen within the plane of the light sheet. The focus distance of the illumination may be adjusted electronically and/or mechanically. For example, rather than relying on the mechanical motor mechanism that may introduce vibrations, the focal distance of an electronically tunable lens may be changed electrically (e.g., via electromagnets, piezoelectric element, current through a solution, etc.) without a use of a motor.

In some embodiments, a lens of variable focal distance is utilized in the detection path of the microscope. This optical device, allowing for fast remote focusing, is inserted into the detection path between the microscope's video output port and the digital camera, or between the microscope's detection objective and the microscope's tube lens. The specimen, in its chamber, is set in a fixed position when the illumination plane and the detection plane move simultaneously through the specimen. As the specimen remains in a steady position, vibrations and perturbation issues are alleviated. Incidentally specimen mounting and holding becomes much easier. Three dimensional acquisition can be achieved at camera frame rate without being limited by mechanical constraints (e.g., 100 fps at 4 Mpixels using a sensitive sCMOS camera).

In some embodiments, if required, a means for influencing the light sheet direction is utilized. Together with the sweeping of the light sheet waist, this means helps reduce or remove altogether shadows occurring within the observed specimen's plane. By integrating these scanning means, the light sheet system not only provides optical sectioning with optimal spatial resolution and signal to noise ratio, but also delivers unprecedented temporal resolution for 3D acquisition, addressing the needs for dynamic imaging of rapid biophysical processes.

Figure 3A:
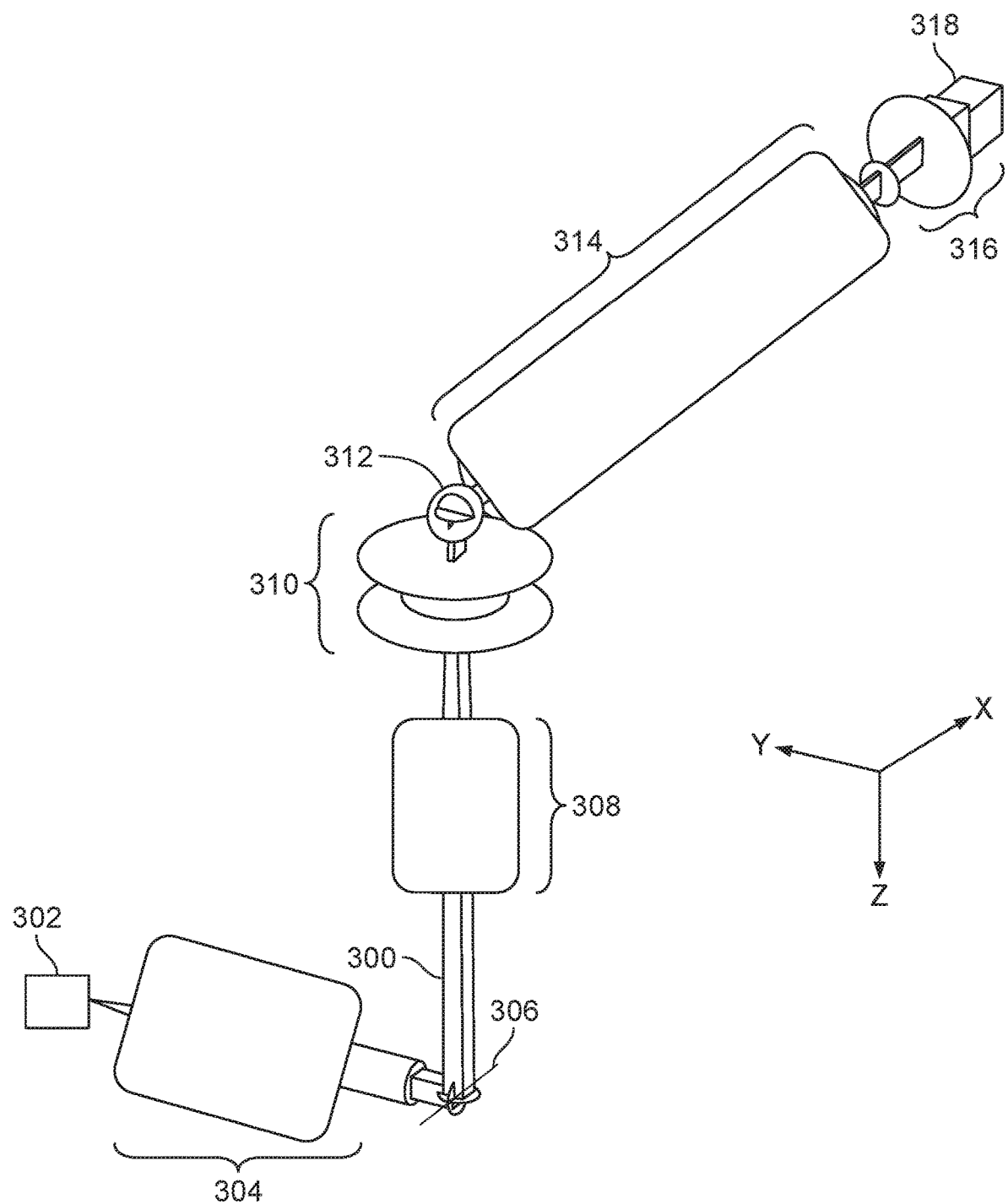
FIG. 3A-FIG. 3D are diagrams illustrating different views of a first embodiment of an illumination path and optical components of an illumination unit.
Figure 3B:
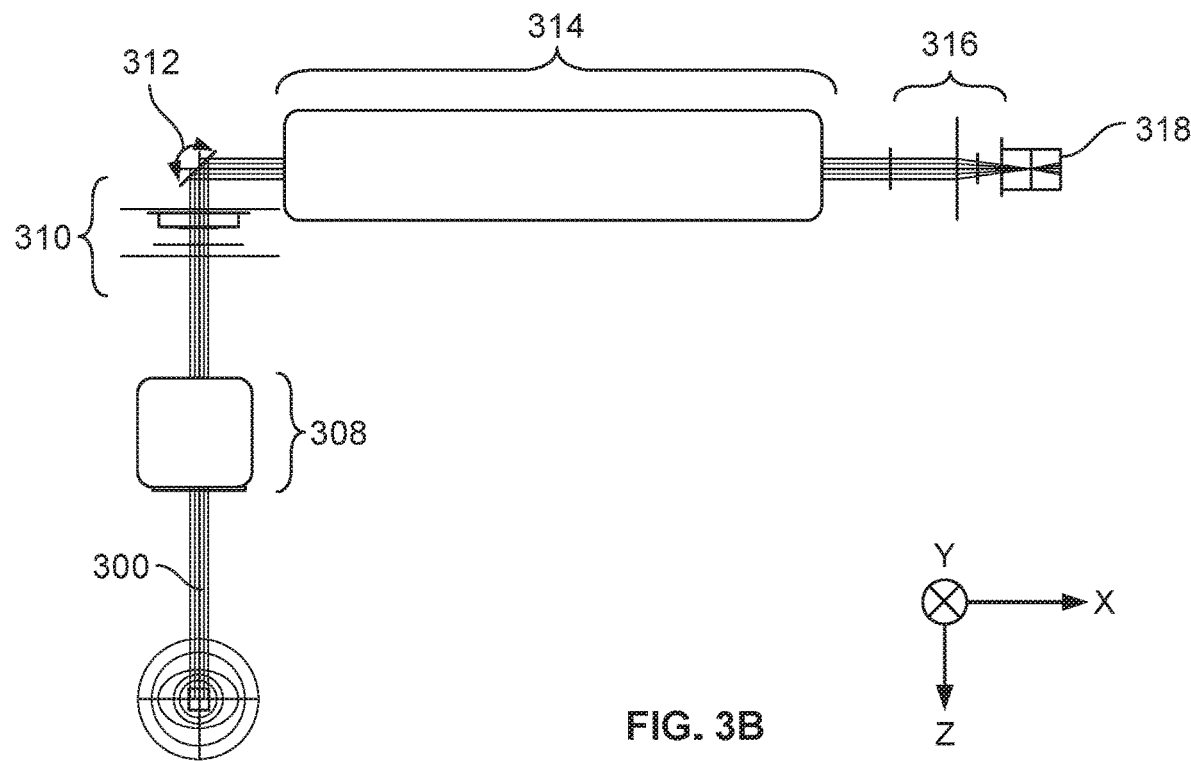
Figure 3C:
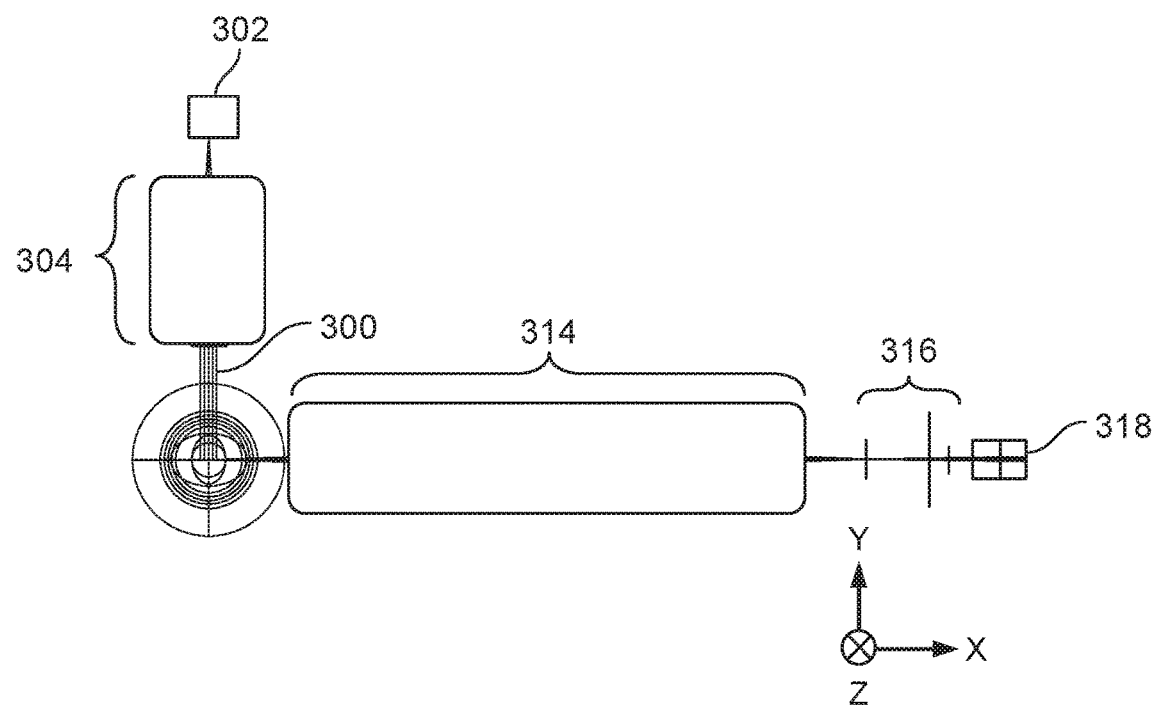
Figure 3D:
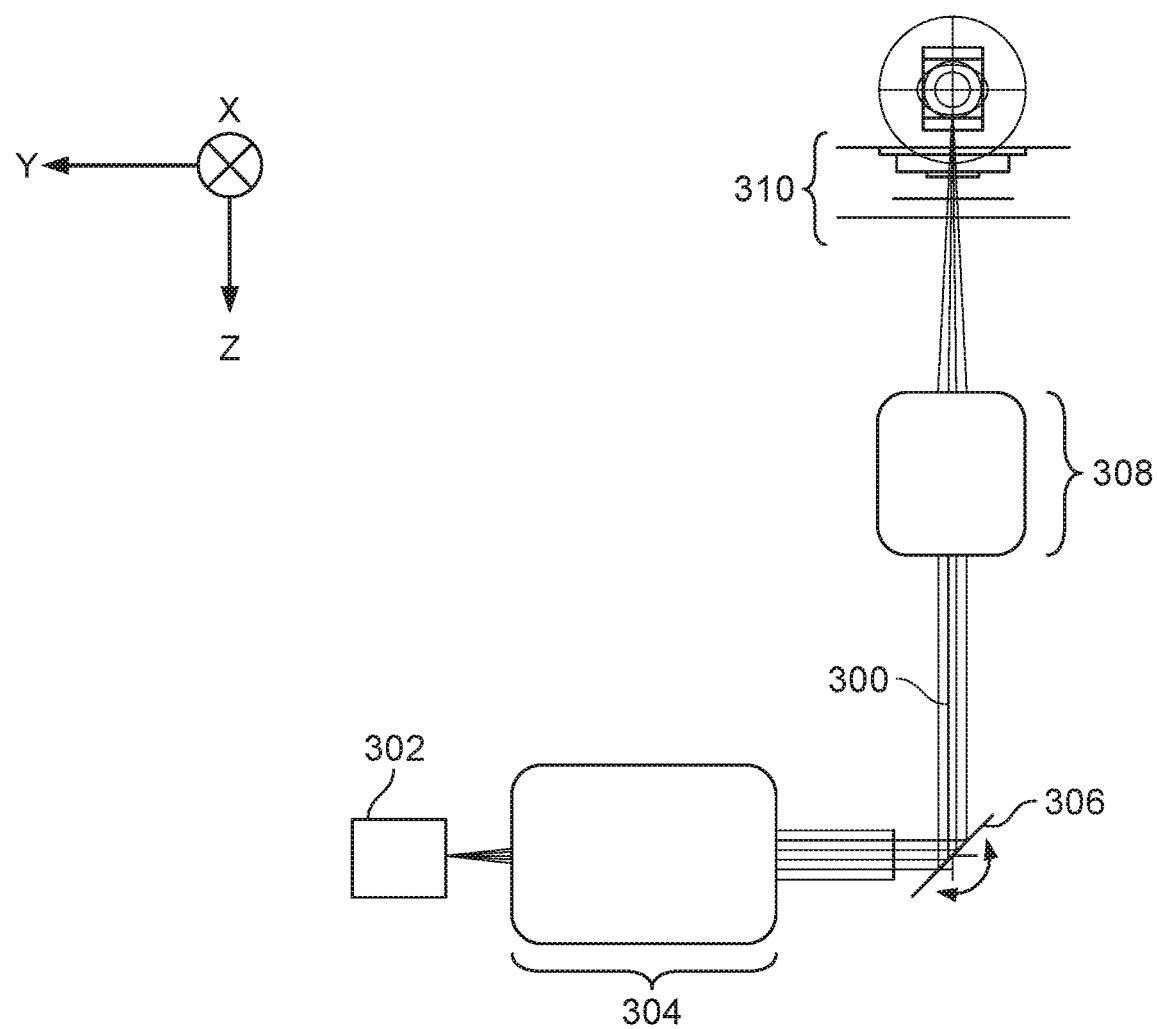

FIG. 3A-FIG. 3D are diagrams illustrating different views of a first embodiment of an illumination path and optical components of an illumination unit. For example, the shown optical components are included and arranged in the shown relative order in illumination component 102 of FIGS. 1A-1B. In some embodiments, two illumination units are utilized and the shown optical components are included and arranged in the corresponding relative order (e.g., mirrored on z-plane from shown arrangement) in illumination component 104 of FIGS. 1A-1B. Not all components of the illumination have been shown. FIG. 3A shows a profile view. FIG. 3B shows a front view. FIG. 3C shows a top view. FIG. 3D shows a side view. The Z-direction axis is the vertical axis.

Illumination path 300 shows a path of light from light source 302 to a specimen in specimen chamber 318 as the light is manipulated by optical components to produce a light sheet to illuminate the specimen. An example of light source 302 is a laser light source that produces a laser light (e.g., laser beam). The light (e.g., light bundle of coherent light) from laser source 302 passes through collimator 304 that aligns the beams of the light using one or more optical lenses. Collimator 304 includes and/or is followed by one or more components with horizontal and vertical slits with adjustable opening widths that allow adjustment of the aperture and field stops. The adjustment of the vertical opening width implements the field stop that influences the width of the light sheet, while the adjustment of the horizontal opening implements the aperture stop that influences the length of the waist (e.g., Length=2×sqrt(2)×Rayleigh length) and the height of the waist of the light sheet. One or more utilized diaphragms (e.g., included in or downstream of the collimator and realizing field and/or angular aperture stops for the light sheet) can be arranged on a changer wheel or maintained in place. The widths of apertures of the diaphragms may be set manually or automatically. A cylindrical lens, for example, can be used as an aspherical optical element.

Next, the light following illumination path 300 is deflected by horizontal optical deflection component 306. An example of horizontal optical deflection component 306 is an oscillating mirror. When optical deflection component 306 is oscillated, it generates scanning horizontal movements of the light sheet (e.g., to reduce shadows in illumination of the specimen). The oscillation of horizontal optical deflection component 306 includes a back and forth rotation (e.g., vibration) about a central rotational axis (e.g., on the x-axis). This oscillation may be achieved via a piezoelectric, mechanical, and/or other electromechanical component. Horizontal optical deflection component 306 is positioned downstream of collimator 304 and diaphragms realizing field and angular aperture stops for the light sheet. As the result of oscillating movement of horizontal optical deflection component 306, the light beam components of the light sheet strike the specimen in specimen chamber 318 at alternating directions many times so as to reduce or remove altogether the shadows caused by opaque specimen substances within the illuminated light sheet plane that might appear in the path of any individual beam component. Thus horizontal optical deflection component 306 enables scanning automatic movement of the horizontal back and forth position (e.g., y-axis direction) of the waist of the light sheet illuminating the specimen.

Then the light following illumination path 300 passes through aspherical component 308 that includes one or more aspherical (e.g., cylindrical lens) optical lens elements (e.g., generates a light bundle with an elliptic cross section).

Then the light following illumination path 300 passes through variable focus lens component 310. An example of variable focus lens component 310 includes an electronically tunable lens with an electronically variable focal distance (e.g., changes focus via electromagnets, piezoelectric element, current through a solution, etc.). Variable focus lens component 310 can be utilized to sweep the focal point across the specimen to create a thinner light sheet over a larger area of the light sheet. For example, focal distance of the illumination lens is automatically and/or continually adjusted/swept across a range of focal distance values to move the focus of the lens across the width of the specimen during image capture to sweep the thinnest point of the light sheet across the specimen. The focal distance of variable focus lens component 310 can be dynamically and automatically tuned/scanned to change the diopter of variable focus lens component 310 in a range that includes both positive and negative diopter values (e.g., between both negative and positive optical powers). For example, variable focus lens component 310 can act both as a converging and diverging lens by electronically adjusting a parameter of variable focus lens component 310. By introducing a lens of variable focal distance into the illumination path of the optical arrangement, sweeping of the light sheet waist is made possible along the illumination direction. Thus variable focus lens component 310 enables automatic movement (e.g., scan) of the horizontal side to side position (e.g., x-axis direction) of the waist of the light sheet illuminating the specimen. In some embodiments, variable focus lens component 310 is positioned at or close to planes optically conjugated with an aperture of illumination objective 316.

Then the light following illumination path 300 is deflected by a vertical optical deflection component 312. An example of vertical optical deflection component 312 is an oscillating mirror. The oscillation of vertical optical deflection component 312 includes a back and forth rotation (e.g., vibration) about a central rotational axis (e.g., on the y-axis). This oscillation may be achieved via a piezoelectric, mechanical, and/or other electromechanical component. When optical deflection component 312 is oscillated, it generates scanning vertical movements of the light sheet. For example, to achieve a scanning vertical (e.g., perpendicular to the plane of the light sheet) movement of the light sheet plane, vertical optical deflection component 312 is positioned downstream of aspherical component 308 generating a light bundle with an elliptic cross section. As the result of linear or oscillating movement of vertical optical deflection component 312, the light beam components of the light sheet strike the specimen at a series of planes thus achieving optical slicing of the specimen, allowing collection of fluorescent emission emitted in consecutive slices within the specimen, by a detector (e.g., digital camera), or to observe the slices in real time directly with an observation lens arrangement (e.g., binoculars). Thus vertical optical deflection component 312 enables automatic movement (e.g., scan) of the vertical position (e.g., z-axis direction) of the waist of the light sheet illuminating the specimen.

Then the light following illumination path 300 passes through optical relay lens component 314. Optical relay lens component 314 includes optical lenses and extends the illumination path and directs the light bundle to the back aperture of illumination objective 316. Using one or more optical lenses, illumination objective 316 emits and focuses the light sheet on the specimen in specimen chamber 318, which is set to emit fluorescent light.

As the result of movement (e.g., linear, oscillating, or other) of the focus of optical components with variable focusing distance, the position of the waist of the light sheet is altered, which results in the illuminating of the substances of the specimen with the light sheet of the thinnest cross section over the widest range along the axis of illumination. This makes it possible to maintain the as fine as possible axial resolution of the light sheet microscopy (e.g., for detection objectives with low to medium numerical aperture (NA), it is determined by the thickness of the light sheet waist) and/or discard the signals from the neighboring slices of the specimen (e.g., for detection objectives with high NA), while imaging at as large as possible a region of interest within the specimen, and, if required, to achieve reduction in shadows occurring within the observed specimen plane as a result of the light sheet illumination.

Figure 4A:
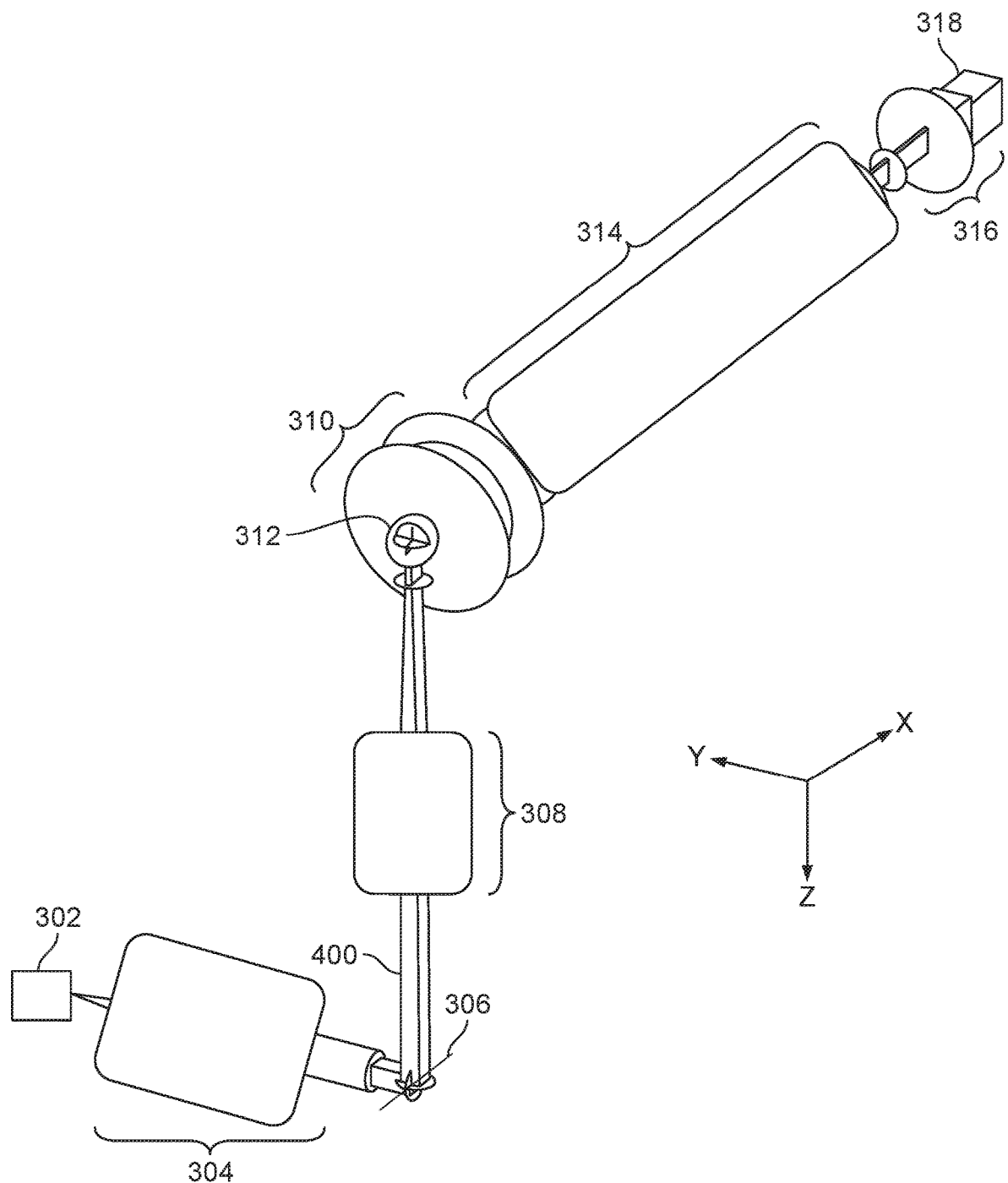
FIG. 4A-FIG. 4D are diagrams illustrating different views of a second embodiment of an illumination path and optical components of an illumination unit.
Figure 4B:
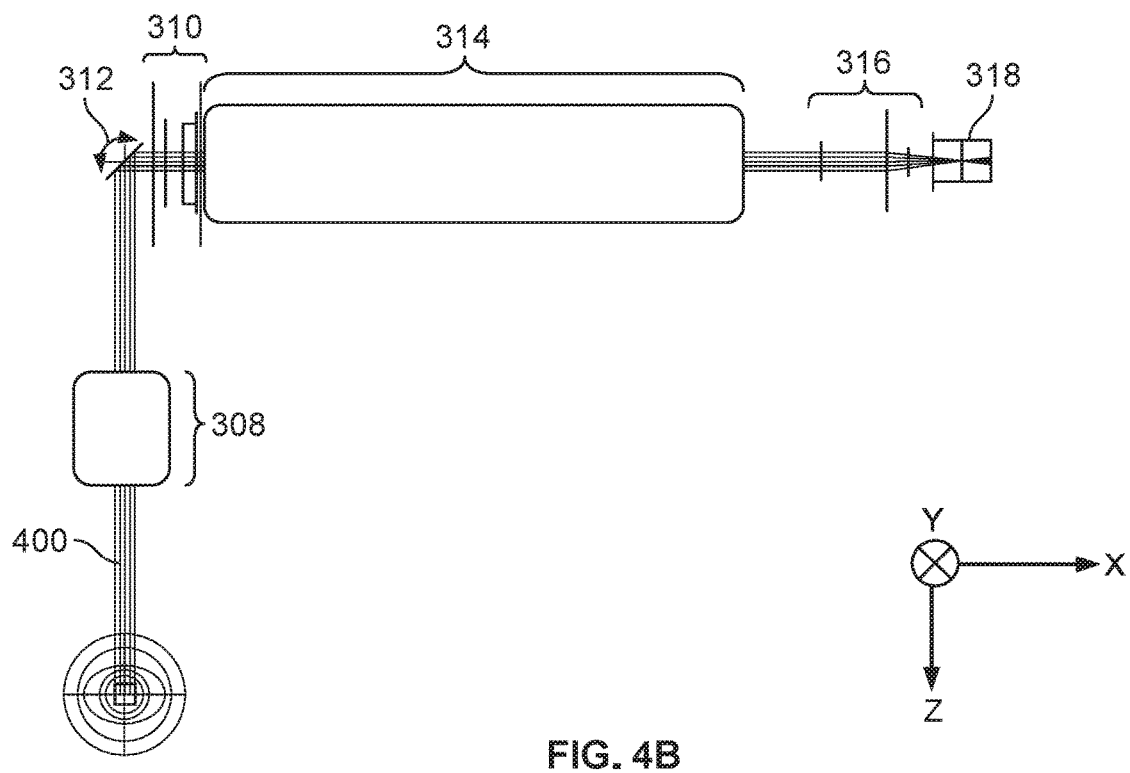
Figure 4C:
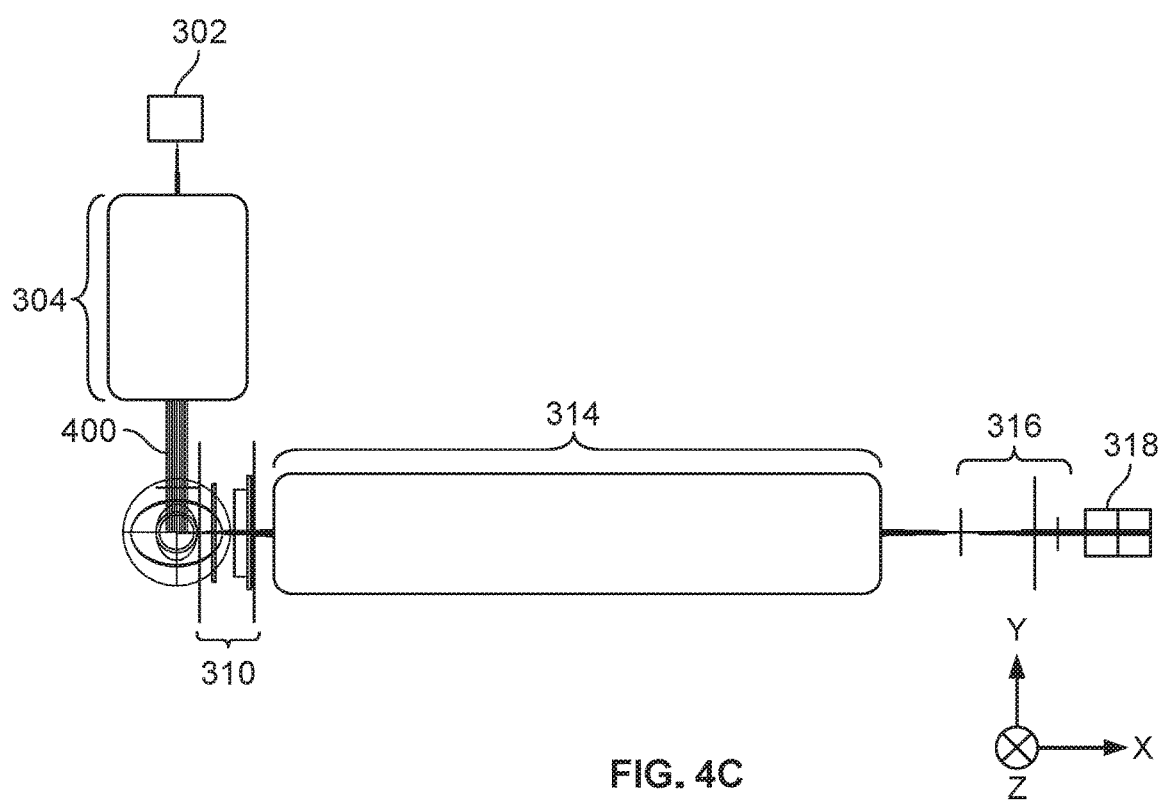
Figure 4D:
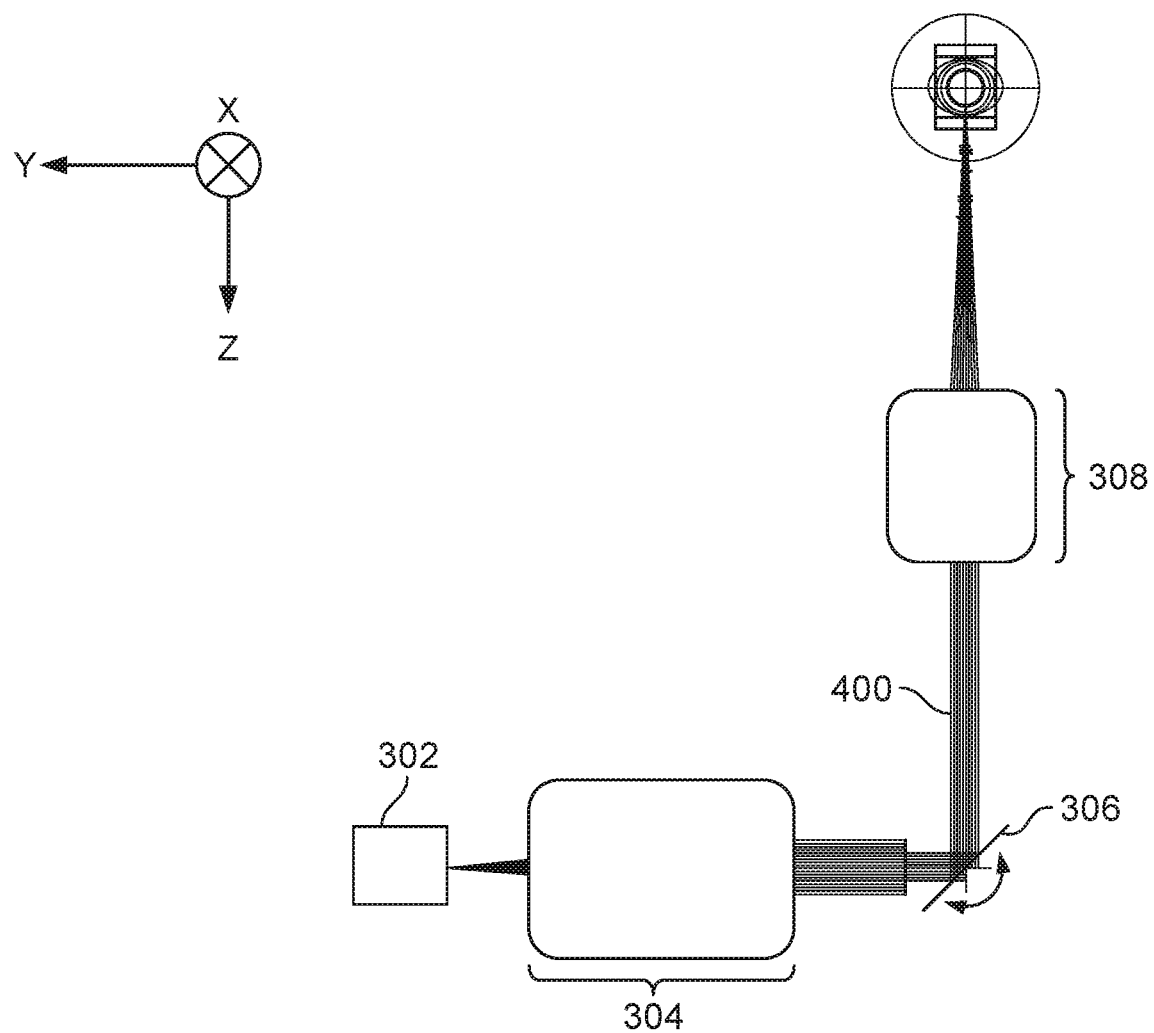

FIG. 4A-FIG. 4D are diagrams illustrating different views of a second embodiment of an illumination path and optical components of an illumination unit. For example, the shown optical components are included and arranged in the shown relative order in illumination component 102 of FIGS. 1A-1B. In some embodiments, two illumination units are utilized and the shown optical components are included and arranged in the corresponding relative order (e.g., mirrored on z-plane from shown arrangement) in illumination component 104 of FIGS. 1A-1B. Not all components of the illumination have been shown. FIG. 4A shows a profile view. FIG. 4B shows a front view. FIG. 4C shows a top view. FIG. 4D shows a side view. The z-direction axis is the vertical axis. A difference between illumination path 400 of FIG. 4A-FIG. 4D and illumination path 300 of FIG. 3A-FIG. 3D includes a location of variable focus lens component 310 in the illumination path relative to the other optical components. In illumination path 400, variable focus lens component 310 is positioned after vertical optical deflection component 312, in between vertical optical deflection component 312 and optical relay lens component 314. This different relative positioning of variable focus lens component 310 allows the shown components to fit in a different physical form factor that may be desired or necessary in certain configurations.

Figure 5A:
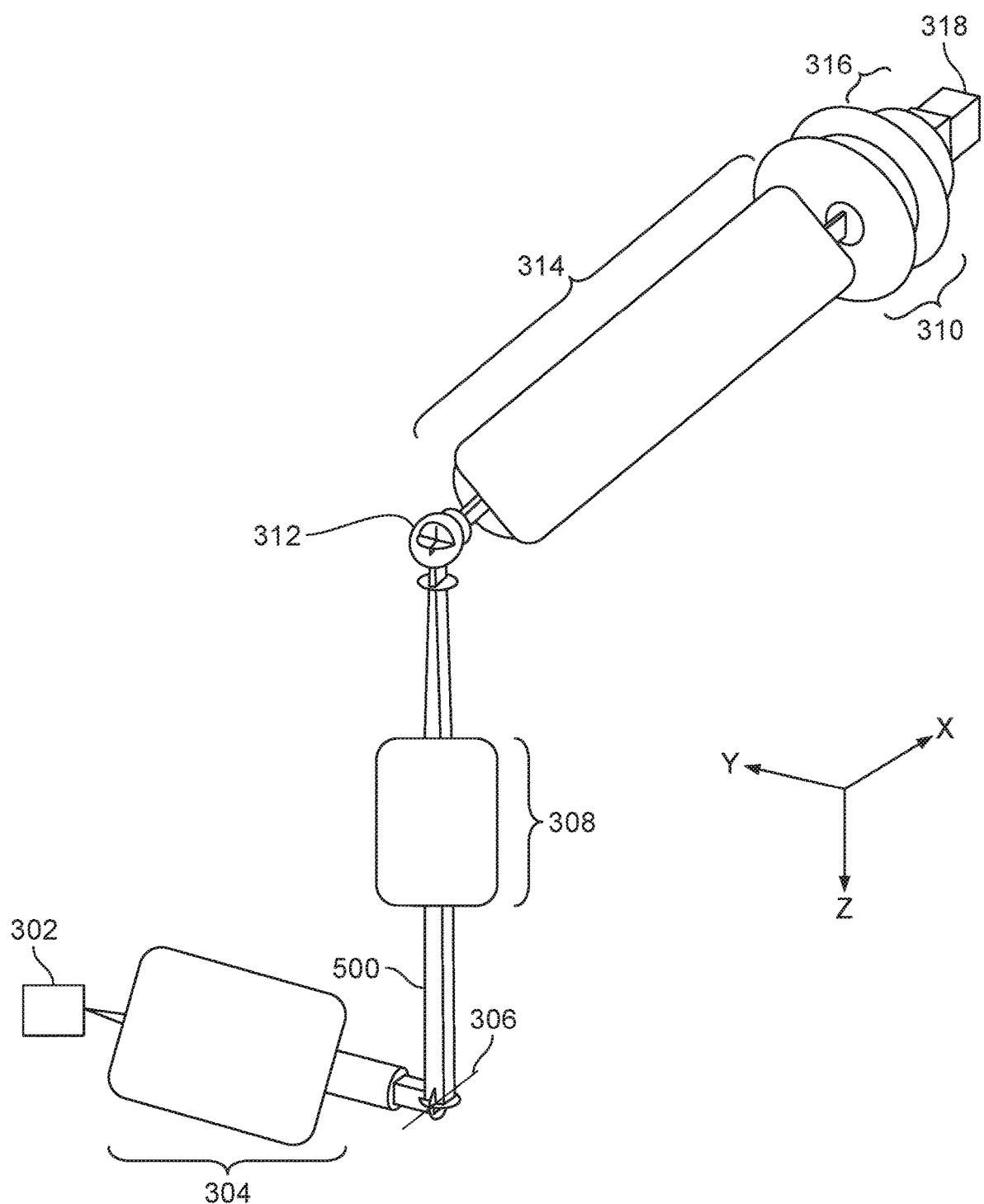
FIG. 5A-FIG. 5D are diagrams illustrating different views of a third embodiment of an illumination path and optical components of an illumination unit.
Figure 5B:
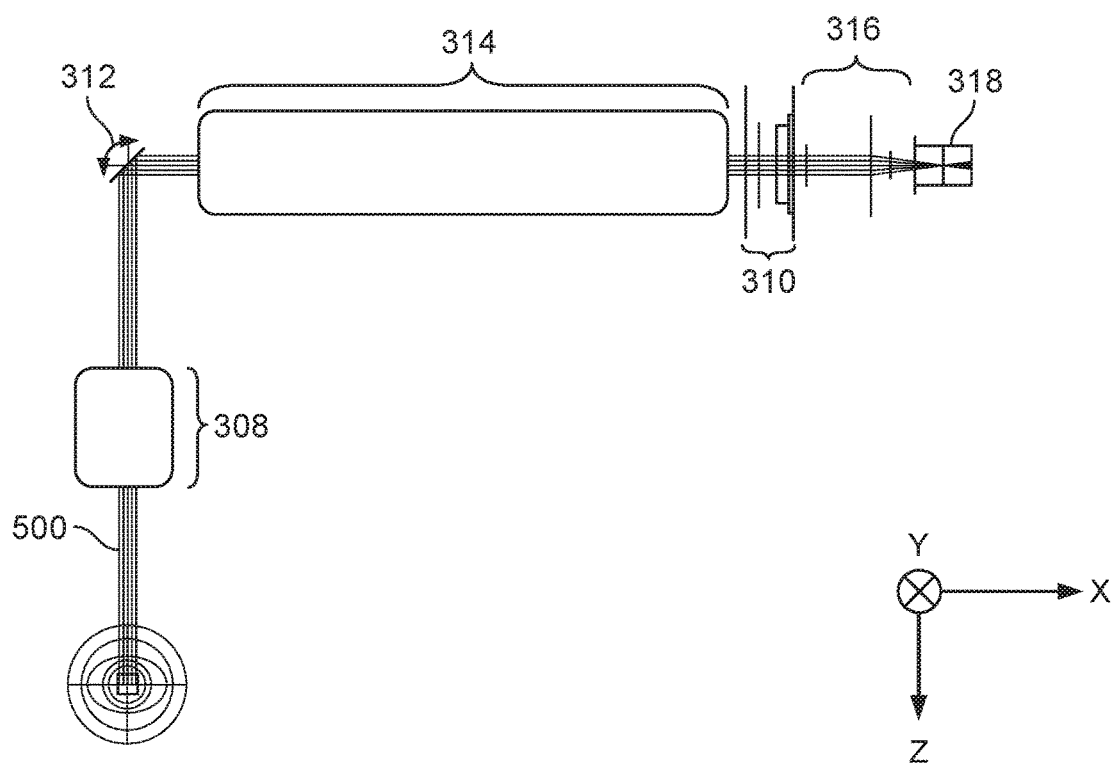
Figure 5C:
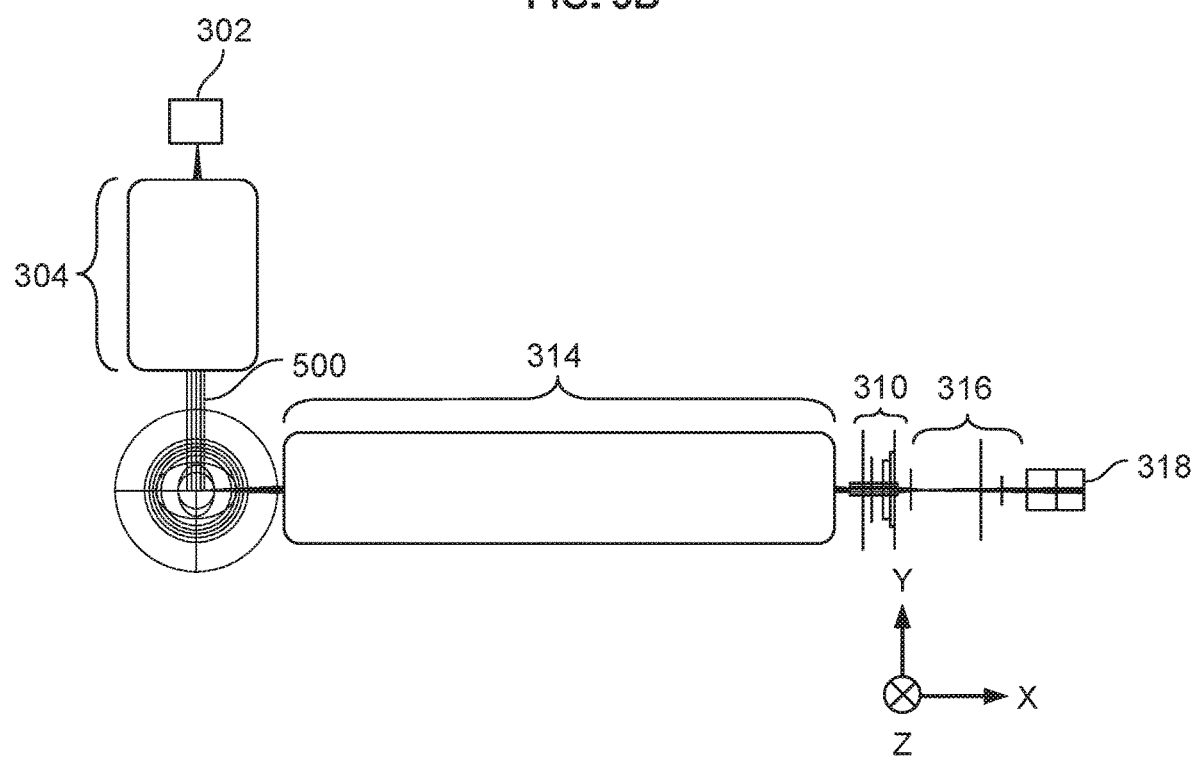
Figure 5D:
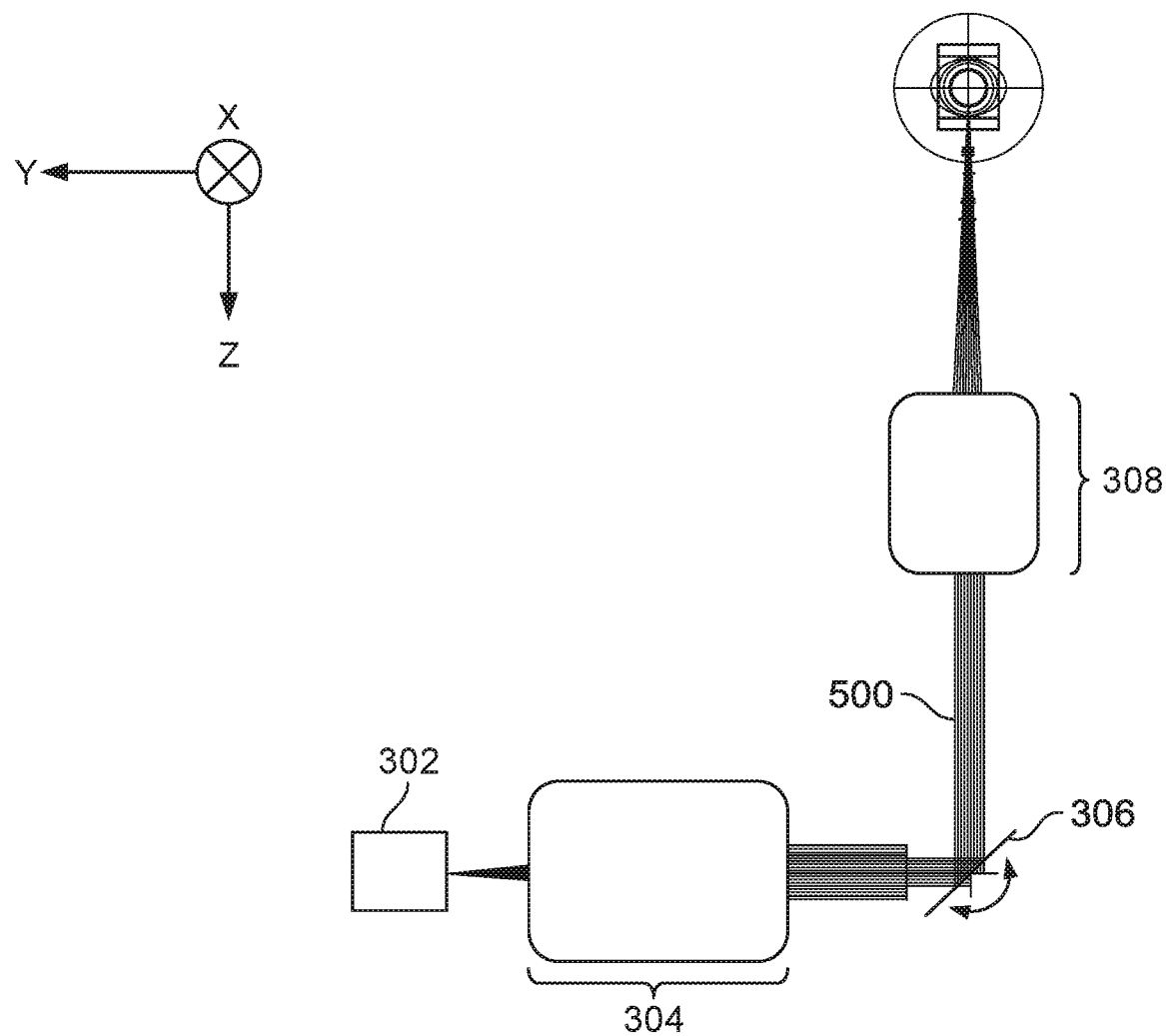

FIG. 5A-FIG. 5D are diagrams illustrating different views of a third embodiment of an illumination path and optical components of an illumination unit. For example, the shown optical components are included and arranged in the shown relative order in illumination component 102 of FIGS. 1A-1B. In some embodiments, two illumination units are utilized and the shown optical components are included and arranged in the corresponding relative order (e.g., mirrored on z-plane from shown arrangement) in illumination component 104 of FIGS. 1A-1B. Not all components of the illumination have been shown. FIG. 5A shows a profile view. FIG. 5B shows a front view. FIG. 5C shows a top view. FIG. 5D shows a side view. The z-direction axis is the vertical axis. A difference between illumination path 500 of FIG. 5A-FIG. 5D and illumination path 300 of FIG. 3A-FIG. 3D includes a location of variable focus lens component 310 in the illumination path relative to the other optical components. In illumination path 500, variable focus lens component 310 is positioned after optical relay lens component 314, in between optical relay lens component 314 and illumination objective 316. This different relative positioning of variable focus lens component 310 allows the shown components to fit in a different physical form factor that may be desired or necessary in certain configurations.

FIG. 6A-FIG. 6E are diagrams illustrating various embodiments of focusing unit add-ons to an optical microscope. High spatial and temporal resolution for a 3D light sheet imaging allows observation of physiological processes of living specimens while keeping them in their natural state without perturbation. Typical methods based on mechanical motion of the specimen for volume acquisition introduce vibrations during the acquisition and limit the scanning speed. As water-dipping objectives are customarily used for observation of biologic specimens in the specimens' natural medium, perturbations from a moving detection objective may influence the specimen behavior under observation and restrain the scope of application for dynamic studies. Larger specimens can also exceed the laser waist (focus) area and reduce the optical sectioning power of the light sheet assembly. In some embodiments, fast and vibration free 3D acquisition is performed using tunable lenses. For example, in order to generate a 3D image of a specimen using SPIM, each slice of the specimen at different depths is illuminated using a light sheet and captured using a lens focused on the slice. The image of the specimen at different depths then can be digitally processed and combined to generate a 3D rendering of the specimen. One way to capture the various slices of the specimen at different depths is to physically move the specimen up and down and/or side to side in increments. However as discussed previously, vibrations introduced in physically moving the specimen may lead to drawbacks.

In some embodiments, instead of moving the specimen for scanning the depth of the specimen, a scanning device based on the lens of dynamically variable focal distance is utilized. Video output focusing unit 602 may be inserted into the detection path between a microscope's video output port and a digital camera, and detection objective output focusing unit 620 may be inserted between the microscope's detection objective and the microscope turret and/or tube lens. One or both of focusing unit 602 and focusing unit 620 may be utilized in various embodiments. Inserting the focusing unit between the optical microscope and the digital camera provides a possibility to switch between several microscope objectives attached to the microscope turret. Inserting the focusing unit between the optical objective and the objective turret of that microscope provides for wider vertical scanning range. Inserting two focusing units, each containing at least one lens of a variable focal distance, is also possible. In that case, one lens (or a set thereof) of a variable focal distance serves as a means to select an average height of the light sheet plane within the specimen, while the other (or the set thereof) serves as a means of selecting a series of planes around the latter plane.

The specimen sample (e.g., in its chamber) is set in a fixed position when the illumination plane (e.g., light sheet is physically moved up and down) and the detection plane move simultaneously through the specimen automatically in sync. The detection plane may be moved by automatically varying the vertical focusing distance of the lens of a focusing unit. In some embodiments, rather than relying on a mechanical motor mechanism that may introduce vibrations, the focusing distance of a focusing unit may be changed electrically (e.g., via an electrically tunable lens that changes focus via electromagnets, piezoelectric element, current through a solution, etc.) without a use of a motor. As the specimen remains in a steady position, vibrations and perturbation issues are alleviated. Incidental specimen mounting and holding becomes much easier. Additionally, if a wider field of view of the specimen is desired, the horizontal sweeping of the "waist" focus of the light sheet as previously discussed may be used in conjunction with the vertical variable focus. This allows the acquisition of images in the light sheet mode where the image of the portion of the specimen being acquired is synchronized using an electronic synchronization system and is automatically focused on the thinnest area of the laser beam being swept vertically and/or horizontally. By synchronizing the detection plane and the light sheet illumination plane, it is possible to collect the fluorescent emission coming essentially only from the light sheet illumination plane. Hence, it provides the sharpest optical sectioning in the whole frame, greatly reducing shadows occurring within the observed specimen.

By setting the focal distance of this lens so as to achieve optical conjugation between the light sheet plane within the specimen and the camera plane, an image of the selected slice within the specimen can be recorded and/or observed. If required, an electronic system including a processor driven by a software program is provided to achieve an automatic optical coupling between the camera plane and the light sheet plane, thus allowing fast 3D light sheet microscopy. The light sheet scanning capability in the illumination path and associated focusing capability onto different planes within the observed specimen in the detection path ensures the optical coupling between the flat illuminated slice within the specimen and the surface of the digital camera with no mechanical movement of the specimen. Avoidance of the mechanical movement of the specimen speeds up collecting light sheet microscopy data, with associated reduction of photo bleaching. Also, this precludes its deformation by the cumulative forces exerted on it by strain related with the interface between the specimen and the water-dipping objective through the matching objective-specimen liquid.

In some embodiments, focal distance of the illumination lens is automatically adjusted to move and sweep the focus of the lens across a range covering the width of the specimen during image capture to automatically sweep the thinnest point of the light sheet across the width of the specimen, and scanning lines of a rolling shutter of the detector (e.g., digital camera) are synchronized with the sweeping position of the waist of the light sheet, allowing a sharper image and a larger field of view without physically moving the specimen within the plane of the light sheet.

By integrating these scanning means, the light sheet system not only provides optical sectioning with optimal spatial resolution and signal to noise ratio, but also delivers unprecedented temporal resolution for 3D acquisition, addressing the needs for dynamic imaging of rapid biophysical processes.

Figure 6A:
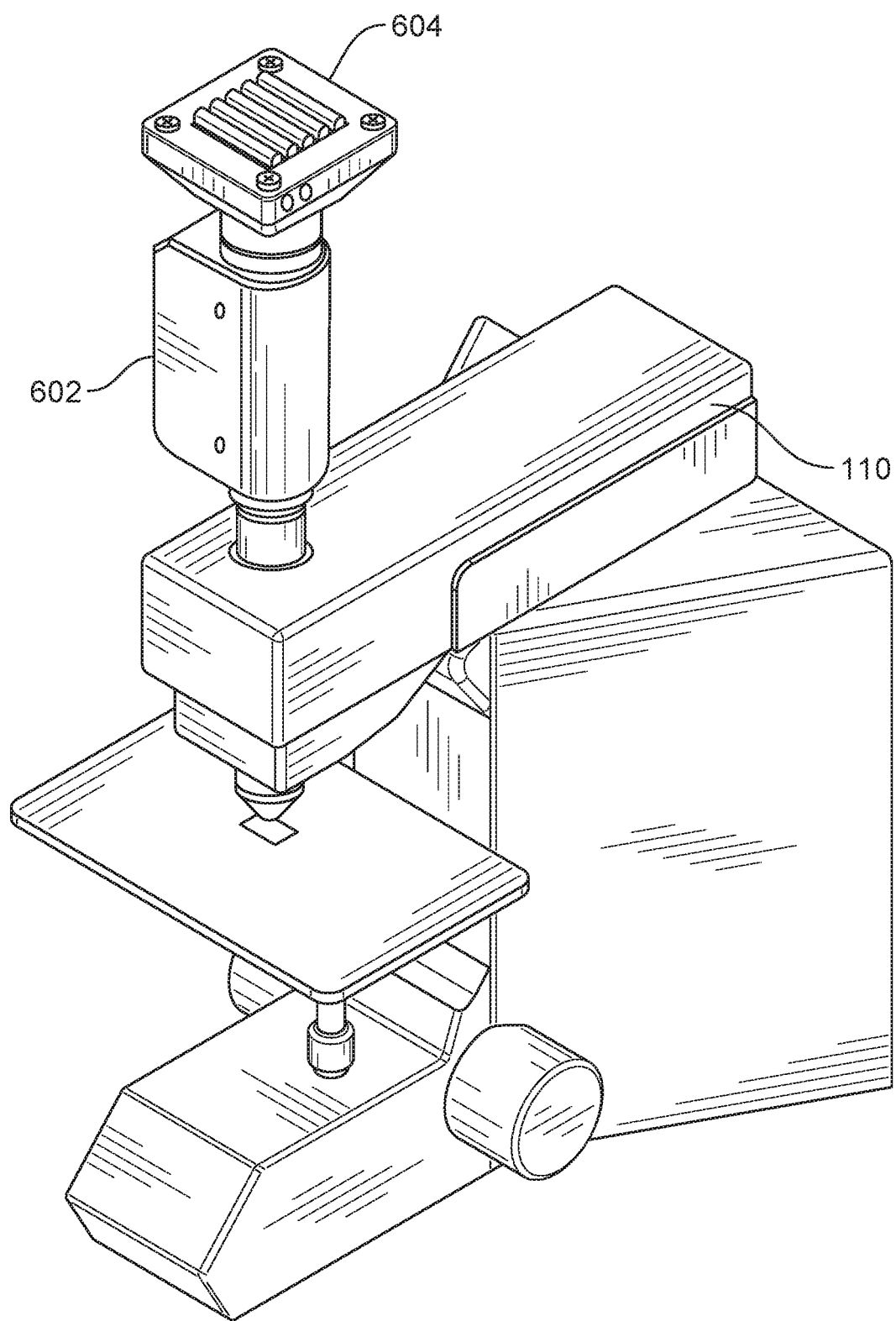
FIG. 6A-FIG. 6E are diagrams illustrating various embodiments of focusing unit add-ons to an optical microscope.
Figure 6B:
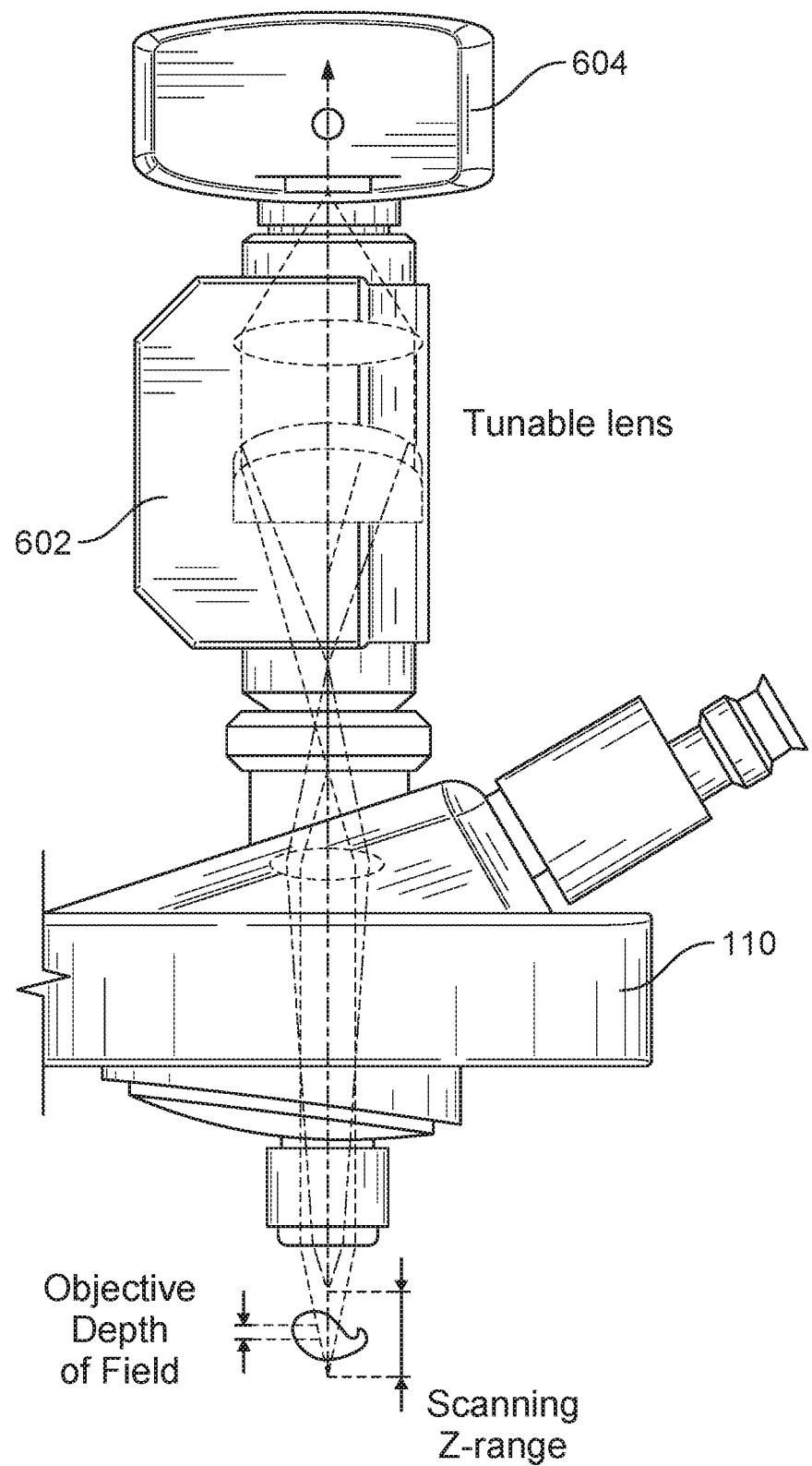
Figure 6C:
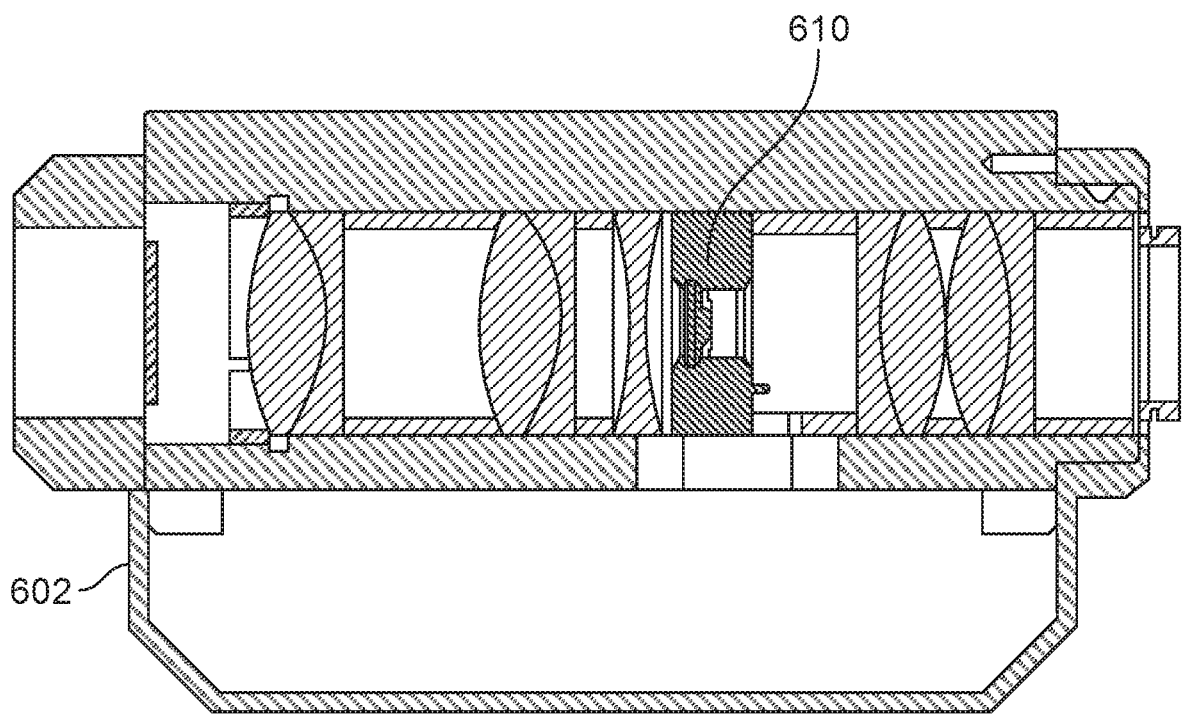

FIG. 6A-FIG. 6C are diagrams illustrating an embodiment of a video output focusing unit add-on to an optical microscope. Video output focusing unit 602 is coupled to a video output port (e.g., C-Mount interface) of optical microscope 110 and an optical input of digital camera 604 (e.g., via screw-threaded, press fit, friction, locking, bayonet, or any other types of connecting/mounting interfaces). For example, focusing unit 602 is included in and/or coupled to detection unit 112 of FIG. 1B. Digital camera 604 is coupled to focusing unit 602 and digital camera 604 captures an image of a specimen obtained via an optical path of lenses of focusing unit 602 added to the optical detection path of microscope 110. Focusing unit 602 has an optical axis that is substantially parallel to the optical axis of the detection objective of the optical microscope for manual or automatic focusing onto the same geometrical plane substantially perpendicular to the optical axis of the detection objective of the optical microscope, which is illuminated by the light generated by one or more illumination sources. Focusing unit 602 includes an arrangement of optical elements with at least one optical element that is able to dynamically change focal distance (e.g., tunable lens 610). FIG. 6C shows an internal cutaway view of focusing unit 602. Tunable lens 610 is able to change its focusing distance electrically (e.g., via electromagnets, piezoelectric element, current through a solution, etc.) without a use of a motor. In other embodiments, focusing distance of focusing unit 602 may be changed mechanically.

Figure 6D:
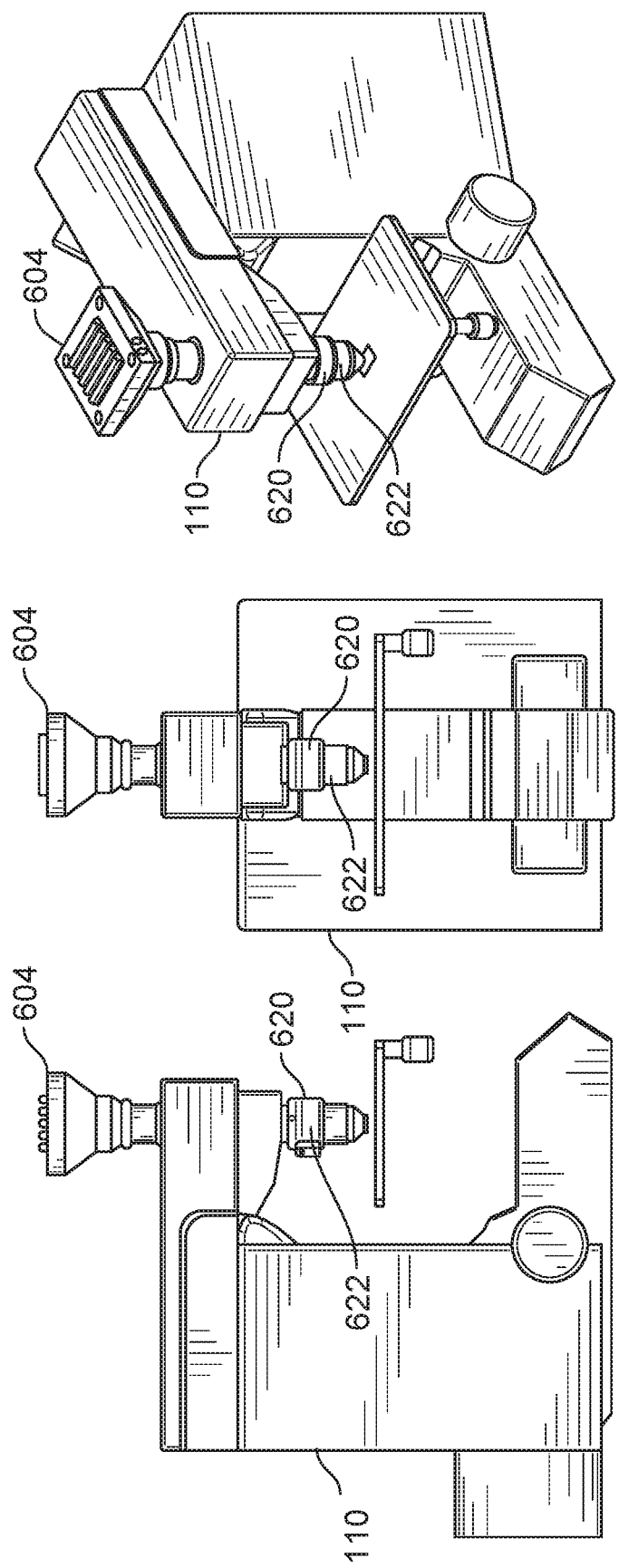
Figure 6E:
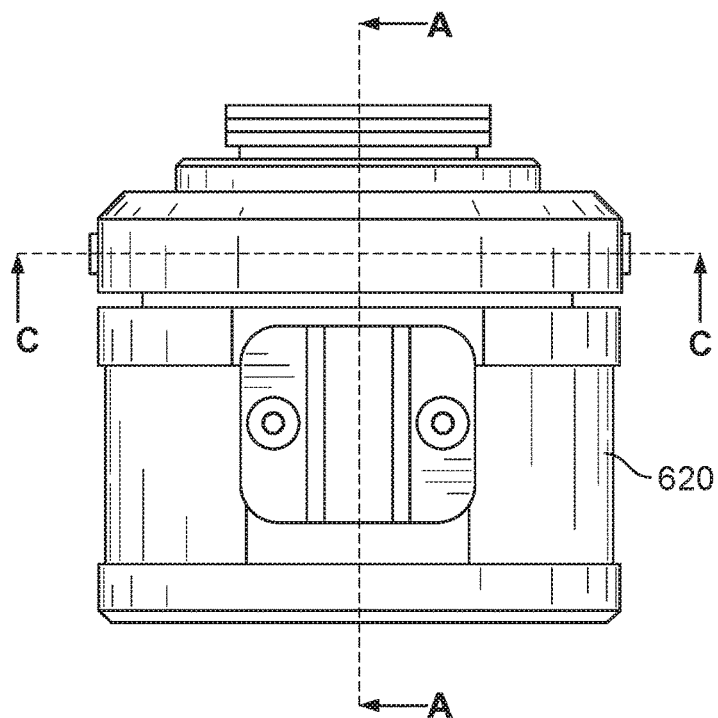
Figure 6E:
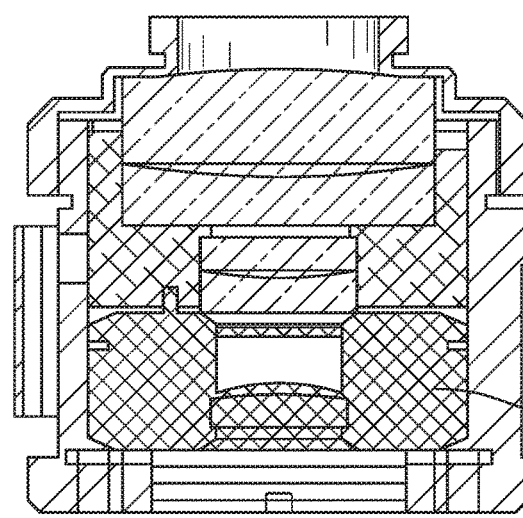
Figure 6E:
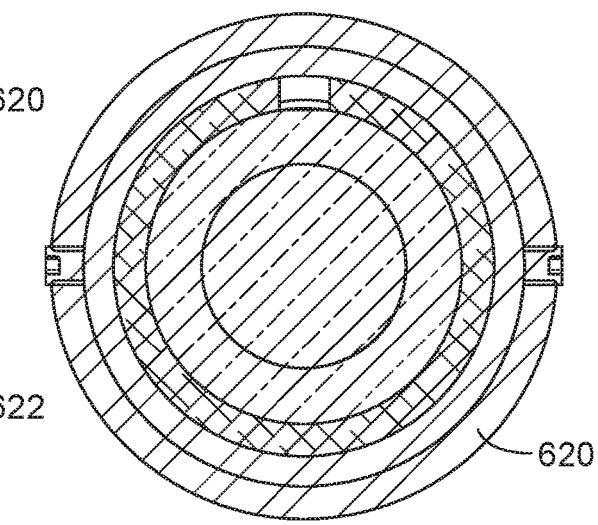

FIG. 6D-FIG. 6E are diagrams illustrating an embodiment of a detection objective output focusing unit add-on to an optical microscope. Detection objective output focusing unit 620 is directly coupled to detection objective 622 and the microscope turret and/or tube lens of optical microscope 110 (e.g., via screw-threaded, press fit, friction, locking, bayonet, or any other types of connecting/mounting interfaces). For example, focusing unit 620 functions an intermediary optical element between optical detection objective 622 and a microscope turret of optical microscope 110. Digital camera 604 is coupled to focusing unit 620 and digital camera 604 captures an image of a specimen obtained via an optical path of lenses of focusing unit 620 added to the optical detection path of microscope 110. Focusing unit 620 has an optical axis that is substantially parallel to the optical axis of the detection objective of the optical microscope for manual or automatic focusing onto the same geometrical plane substantially perpendicular to the optical axis of the detection objective of the optical microscope, which is illuminated by the light generated by one or more illumination sources. Focusing unit 620 includes an arrangement of optical elements with at least one optical element that is able to dynamically change focal distance (e.g., tunable lens 622). FIG. 6E shows an external side view and various internal cutaway views of focusing unit 620. Tunable lens 622 is able to change its focusing distance electrically (e.g., via electromagnets, piezoelectric element, current through a solution, etc.) without a use of a motor. In other embodiments, focusing distance of focusing unit 620 may be changed mechanically.

Figure 7:
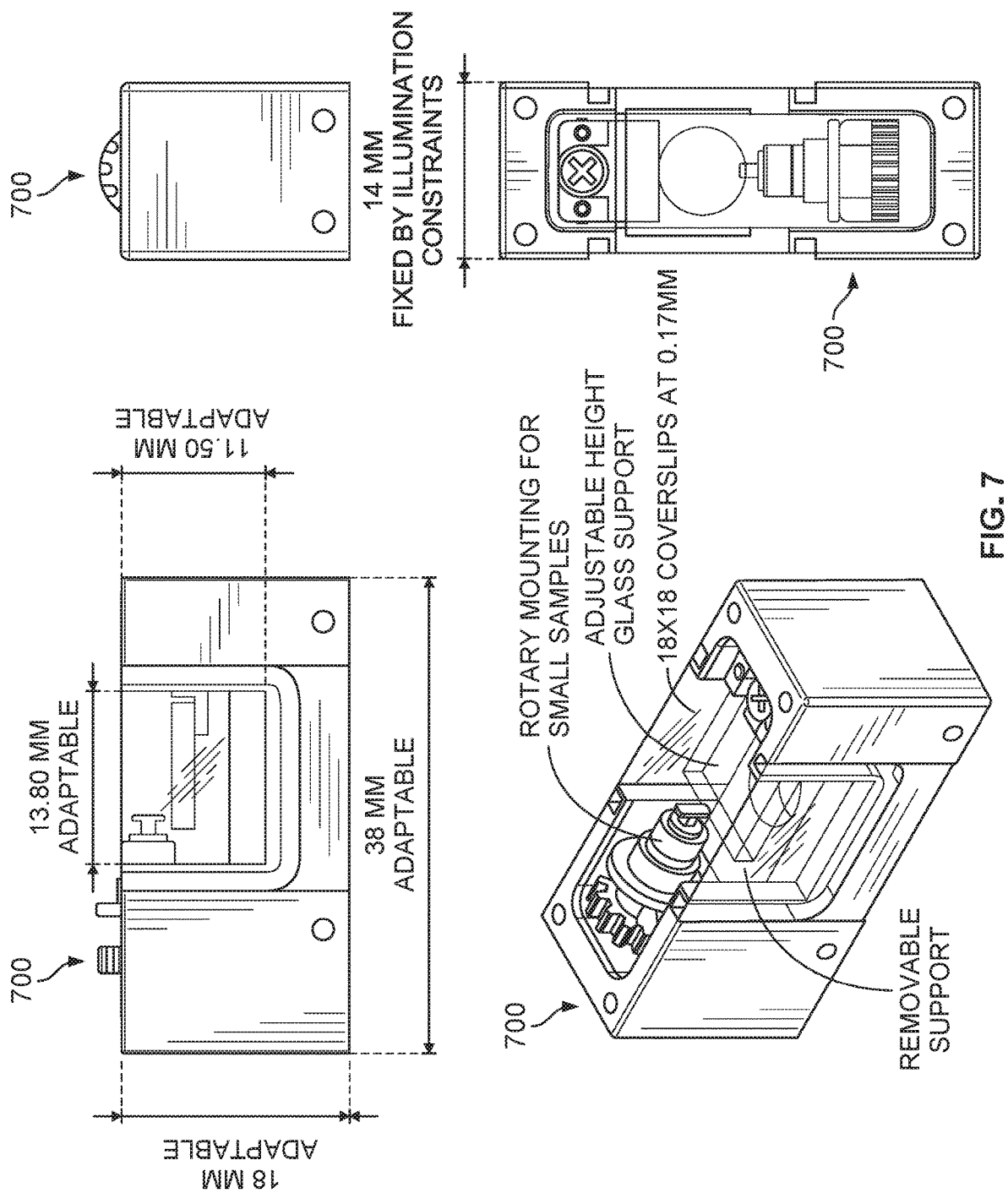
FIG. 7 is a diagram illustrating an embodiment of a specimen holding chamber assembly.

FIG. 7 is a diagram illustrating an embodiment of a specimen holding chamber assembly. FIG. 7 shows various different view angles of specimen chamber assembly 700. An example of specimen chamber assembly 700 is specimen chamber and holder assembly 116 in FIG. 1B.

In typical SPIM systems, the specimen is held in a container that is observed horizontally due to the potential deformability of the specimen embedding medium as a result of the action of gravitational force. This is because the optical axis of the detection lens of the microscope cannot extend vertically, as it does in the conventional configuration of the majority of upright or inverted optical microscopes. However, a vast majority of the conventional vertical (e.g., upright or inverted) microscopes have detection objective's optical axes extending vertically. Thus, conventional specimen holding systems for SPIM often cannot be utilized in these vertical microscopes. Therefore, there is a need both in providing chambers that are filled with immersion medium and that can be used in conventional vertical microscopes, comprising an open top yielding unhindered access to both air and immersion objectives, a substantially transparent bottom side for viewing the specimens in transmission mode, and designed to be easily removable from the microscope's stand for the microscope to retrieve its original, for example wide field, functional configuration.

Specimen chamber assembly 700 includes a chamber that is enclosed on the sides and bottom but open on the top (allowing a direct medium immersion for a detection objective). The bottom of the chamber is substantially transparent for observation in transmission mode and coarse specimen positioning. Two of the sides include substantially transparent coverslips that allow a light sheet to pass through to illuminate a specimen placed in the chamber. In some embodiments, the specimen is placed in the chamber of specimen chamber assembly 700 on a height adjustable (e.g., by turning a pin/screw/knob) glass support. The glass support may be removed from the chamber (or moved away) and a rotary mounting (e.g., T-spike holder) coupled to a cylindrical specimen holder holding a specimen may be placed in the chamber. The rotary mounting coupled to a cylindrical specimen holder can be laid horizontally in the chamber and the specimen can be rotated about a horizontal axis by rotating a knob and/or via gears that are coupled to a rotating mechanism (e.g., may be motorized). For example, a specimen is embedded in a substantially rigid cylindrical transparent embedding compound maintained in an immersion liquid and placed in a rotary mount coupled to the chamber. The rotary mount allows a rotational movement of the specimen using a rotational drive or knob about a substantially horizontal rotational axis and substantially perpendicular to the optical axis of the detection objective.

In some embodiments, the chamber of assembly 700 is filled with an immersion solution. For example, the chamber that includes a specimen (e.g., either on a glass support or in a cylindrical specimen holder) is filled with a saline solution, allowing the use of water dipping/immersion objectives. In some embodiments, to ensure better resistance against various corrosive agents such as salt water or cleaning agents and ease of cleaning/sonicating/autoclaving, non-transparent parts of chamber assembly 700 are to be made from medical grade and Polytetrafluoroethylene (e.g., Teflon) parts, suited to be used together with temperature control equipment for precise temperature control and equipped with nozzles that allow constant carbon dioxide control during experimentation by flowing carbon dioxide on the top of the chamber. For precise temperature control throughout an experiment, the baseplate of the chamber is configured for temperature control. This allows transmission of heating/cooling via contact with a liquid circulation interface for temperature control (e.g., allowing temperature control from 15° C. to 37° C.). Carbon dioxide control is achieved through nozzles that allow a desired carbon dioxide flow on the top of the chamber.

Figure 8:
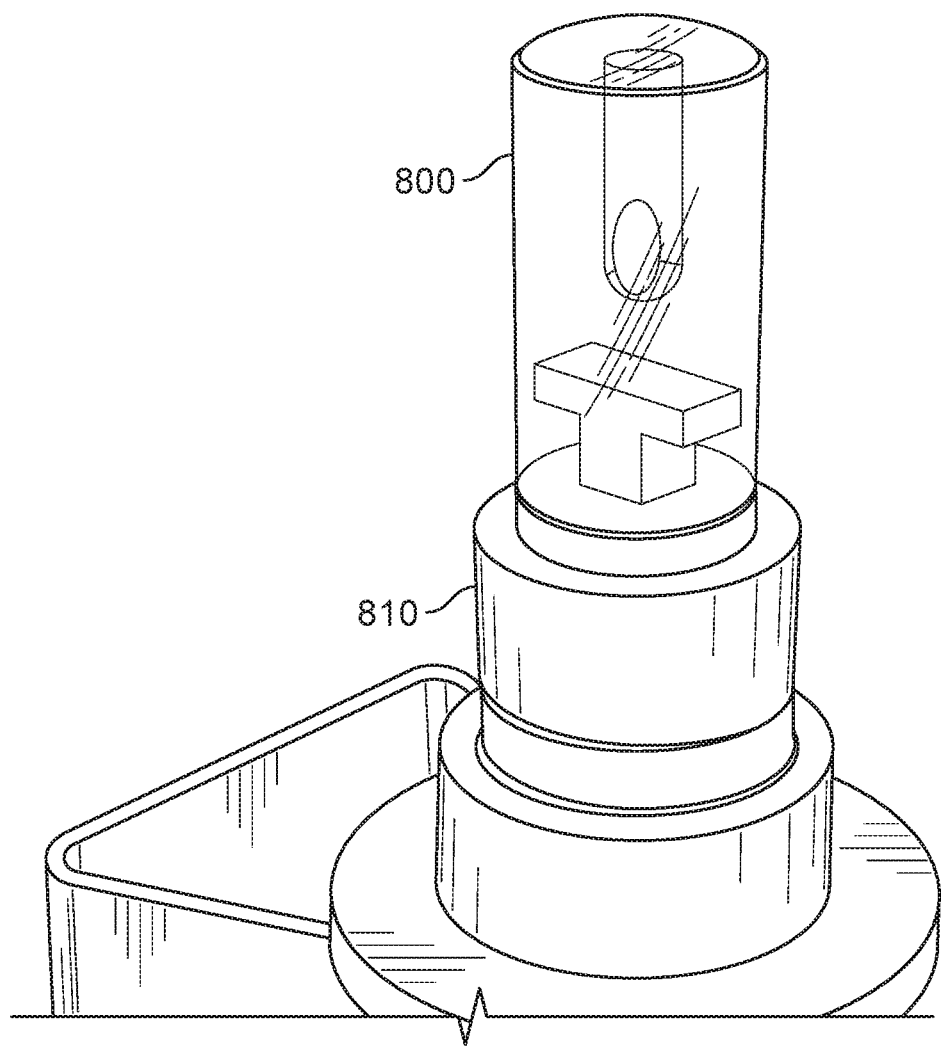
FIG. 8 is a diagram illustrating an embodiment of a mold-formed specimen holder over a T-spike rotary mounting.

FIG. 8 is a diagram illustrating an embodiment of a mold-formed specimen holder over a T-spike rotary mounting. In some embodiments, specimen holder 800 is placed horizontally in the chamber of chamber assembly 700 shown in FIG. 7 for observation of the included specimen via SPIM performed using the system shown in FIG. 1B. Using the conventional upright or inversed microscope's objective arrangement as a detection path of the selective plane light sheet system may require the specimen to be rotated about its horizontal axis. In some embodiments, a specimen is embedded in an embedding medium with an increased rigidity sufficient to withstand the actions of gravitational forces when the medium is placed horizontally. For example, the shown specimen holder allows the specimen to be embedded within the substantially transparent embedding medium in a horizontal direction, perpendicular to the substantially vertical orientation of the optical axis of the detection objective arrangement in upright and inverted microscopes, allowing imaging of transient events in living biological specimens.

Specimen holder 800 has been formed by molding a substantially transparent material in a cylindrical shape over T-spike rotary mounting 810. In some embodiments, T-spike rotary mounting 810 includes a medical grade Polytetrafluoroethylene material. A specimen is placed inside the molded substantially transparent material and sealed to contain the specimen within the substantially transparent material even if the molded holder is placed in a horizontal position. The specimen and the specimen holder may be rotated by rotating the T-spike rotary mounting (e.g., rotation by knob or gear within chamber assembly 700 of FIG. 7 placed under a microscope). Prior specimen mounting and specimen holder solutions for selective plane light sheet microscopy that exist to date have not been designed to be used with a conventional microscope stand. Unlike the embodiments described herein, prior specimen mounting methods do not offer fast, efficient, and reproducible results, neither do they guarantee stable specimen positioning for the observation and image acquisition. In some embodiments, an embedding medium is formed with sufficient rigidity to withstand manipulating it around a substantially horizontal direction with repeatable specimen positioning that greatly alleviates the need for refocusing on the specimen.

Figure 9:
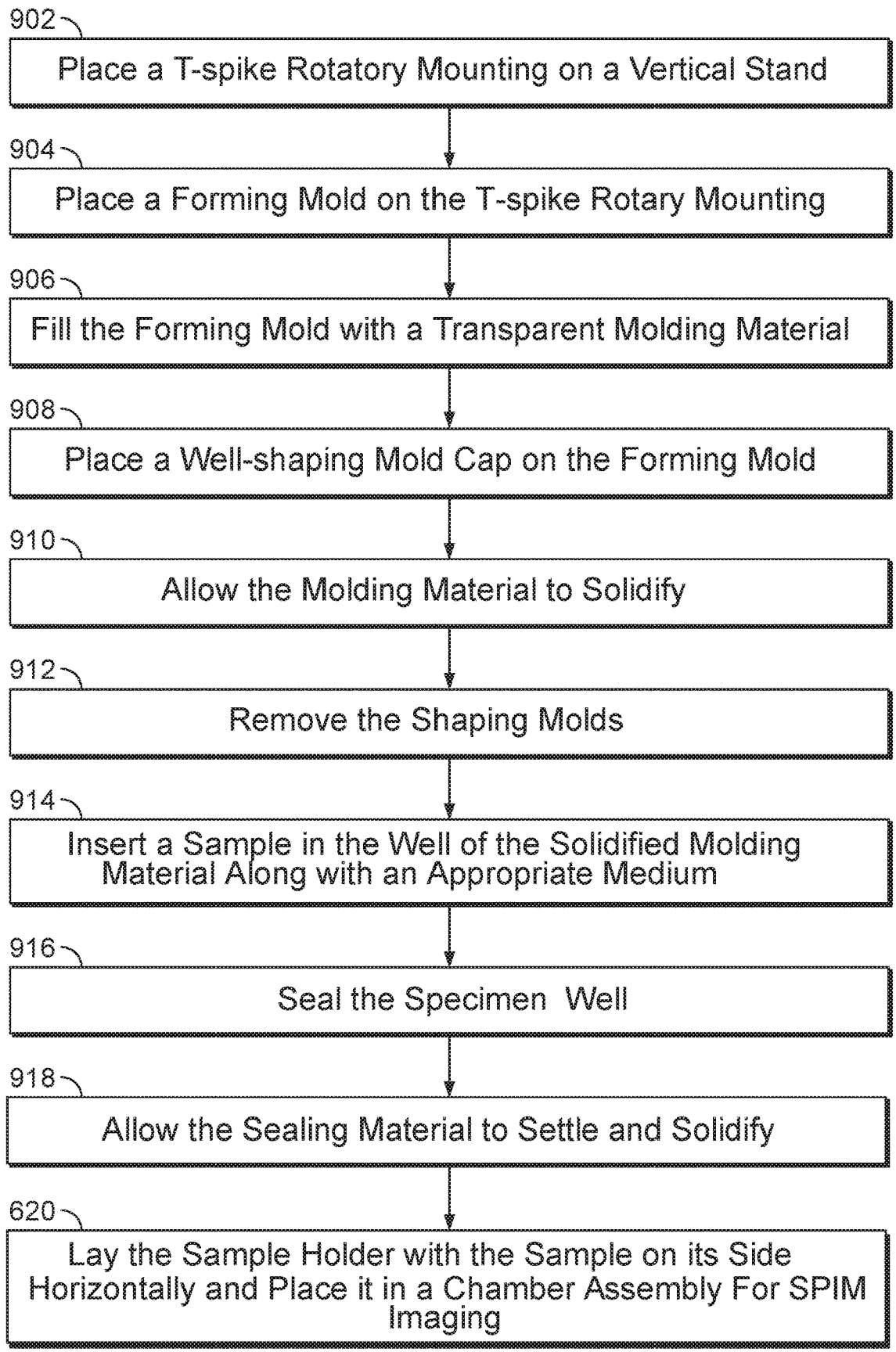
FIG. 9 is a diagram illustrating an embodiment of a process for forming a molded specimen holder.

FIG. 9 is a flowchart illustrating an embodiment of a process for forming a molded specimen holder. For example, the process of FIG. 9 is utilized to form specimen holder 800 shown in FIG. 8. FIGS. 10A-10H illustrate an embodiment of various steps of forming a molded specimen holder.

Figure 10A:
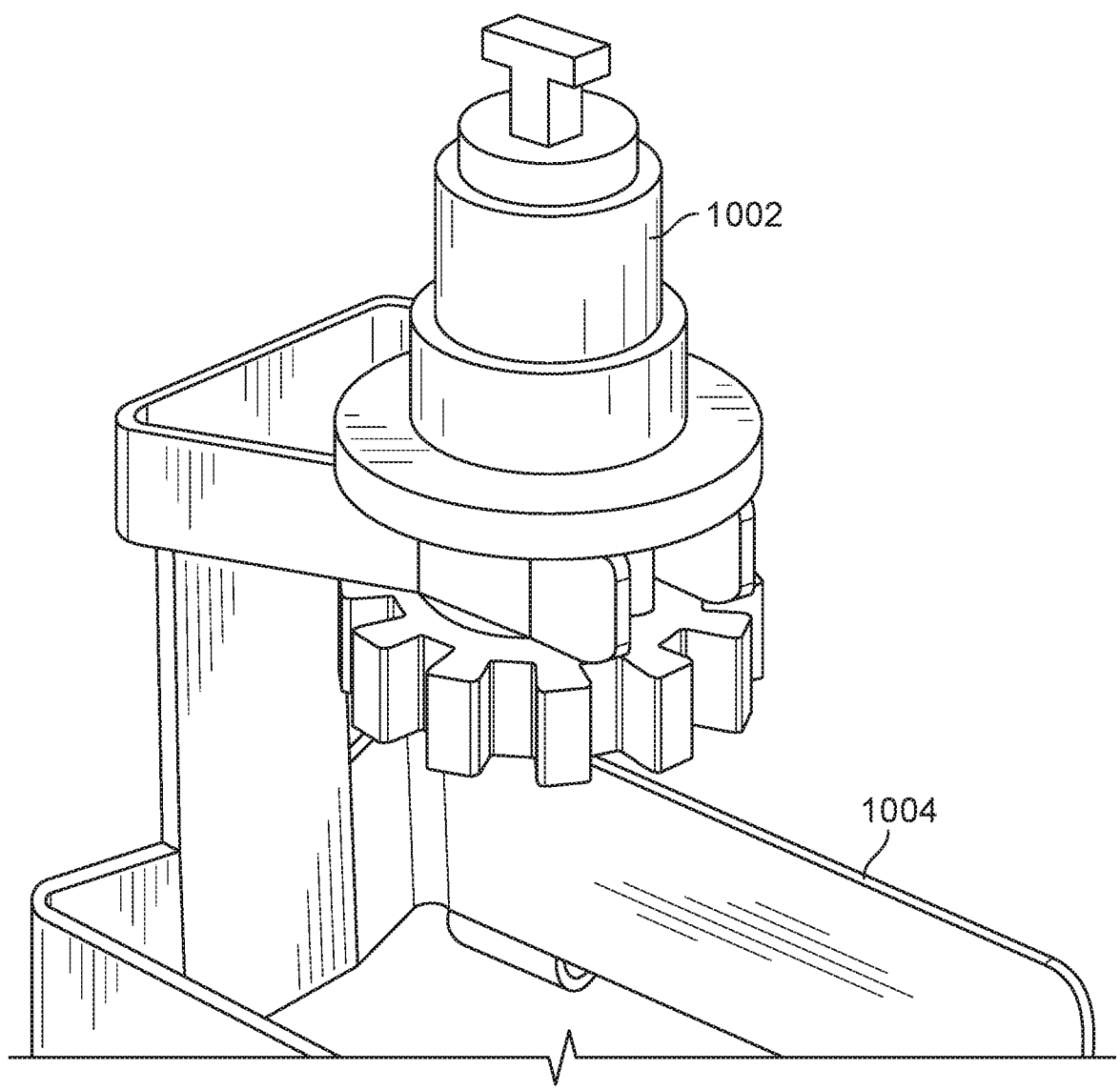
FIGS. 10A-10H illustrate an embodiment of various steps of forming a molded specimen holder.

At 902, a T-spike rotary mounting is placed on a vertical stand. In some embodiments, the T-spike rotary mounting is the rotatory mounting shown in FIG. 8. The vertical holder allows the T-spike rotary mounting to be positioned vertically for the molding process and the mounting is removed from the vertical stand after the molding process for placement inside a chamber of a chamber assembly (e.g., shown in FIG. 7). An example of the placement of the T-spike rotary mounting 1002 on the vertical stand 1004 is illustrated in FIG. 10A.

Figure 10B:
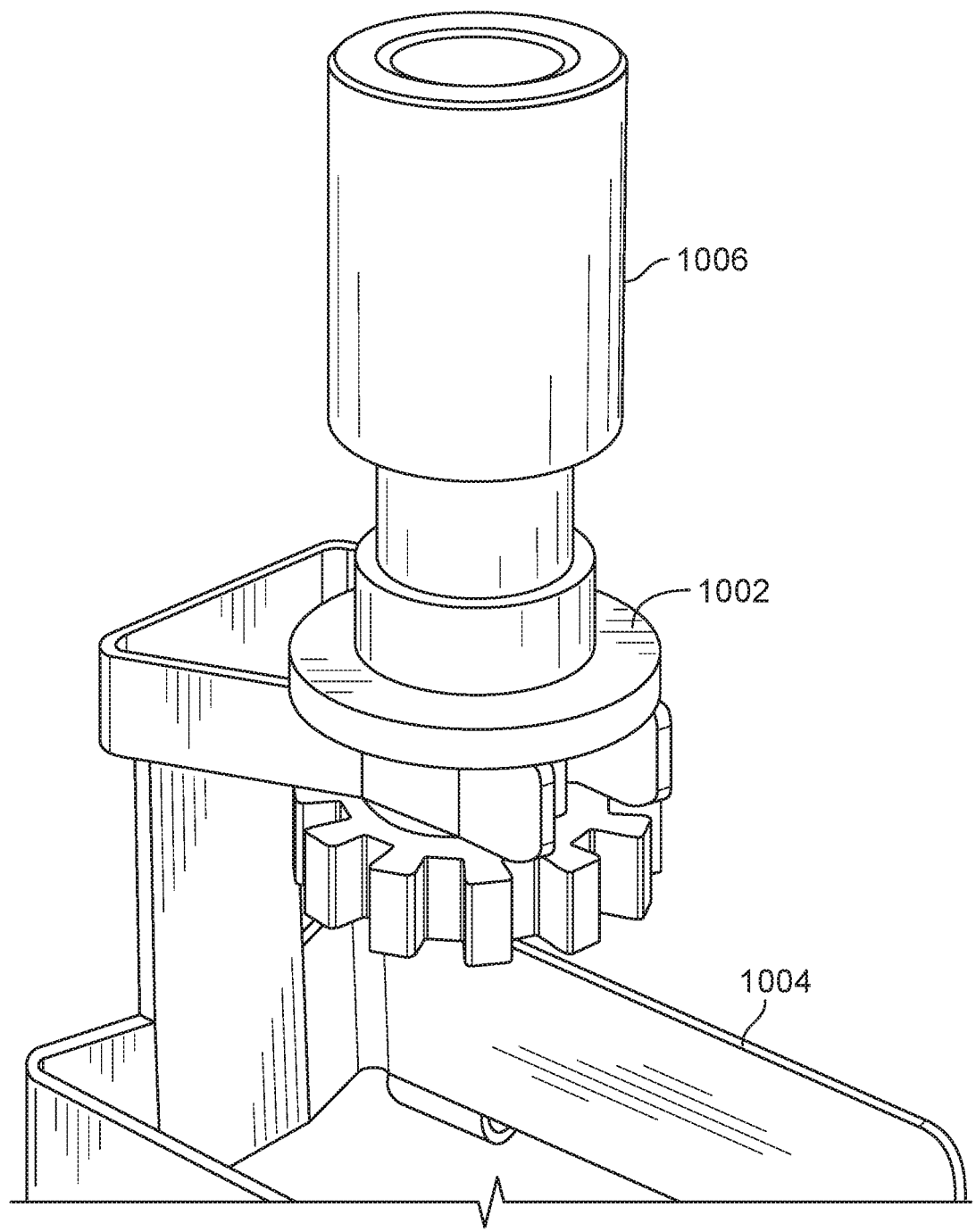

At 904, a forming mold is placed on the T-spike rotary mounting. For example, the forming mold is a hollow cylinder that can be coupled to the T-spike rotary mounting. The forming mold tightly fits onto the rotary mounting to avoid leakage of any liquid material filled in the forming mold. An example of the placement of forming mold 1006 over T-spike rotary mounting 1002 is illustrated in FIG. 10B.

Figure 10C:
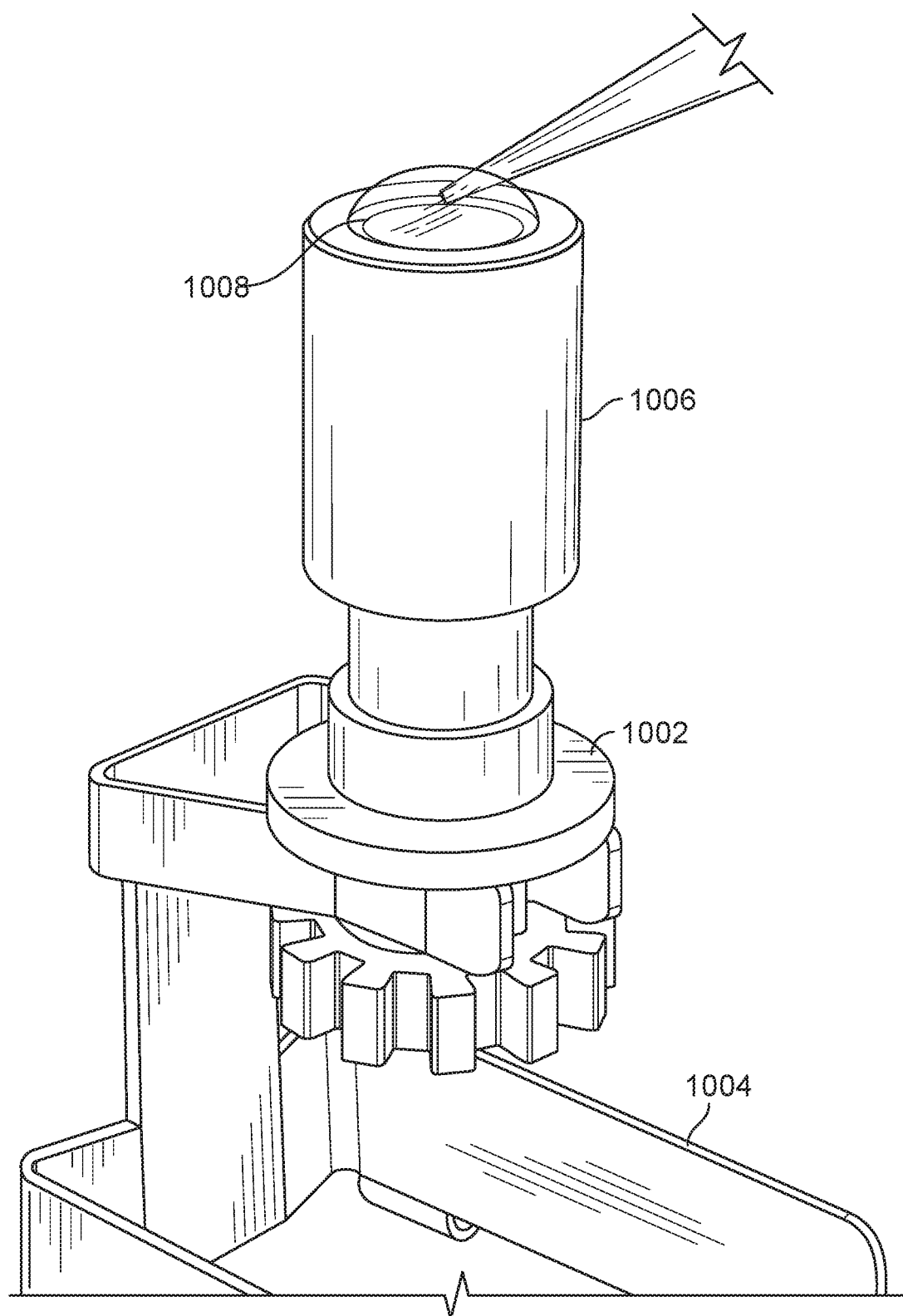

At 906, the forming mold is filled with a substantially transparent molding material. The molding material may be initially in a liquid or gel state and will solidify over a period of time to become rigid. Examples of the substantially transparent molding material include agar, agarose, gellan gum, or another gelling agent. For example, a Phytagel solution (e.g., 0.8%) is filled in the forming mold. An example of the filling of the inside cavity of the forming mold with molding material 1008 using a pipette is shown in FIG. 10C.

Figure 10D:
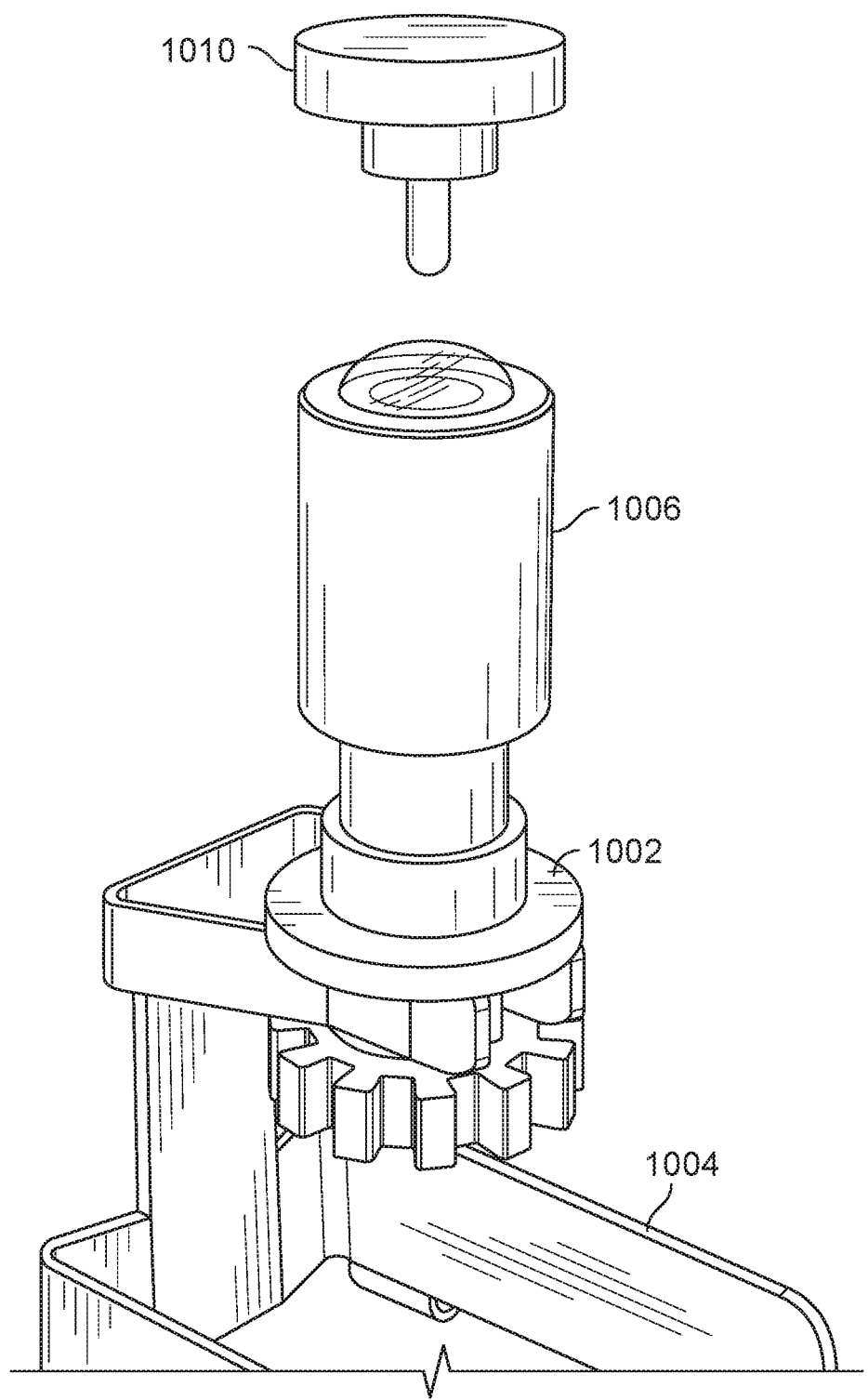
Figure 10E:
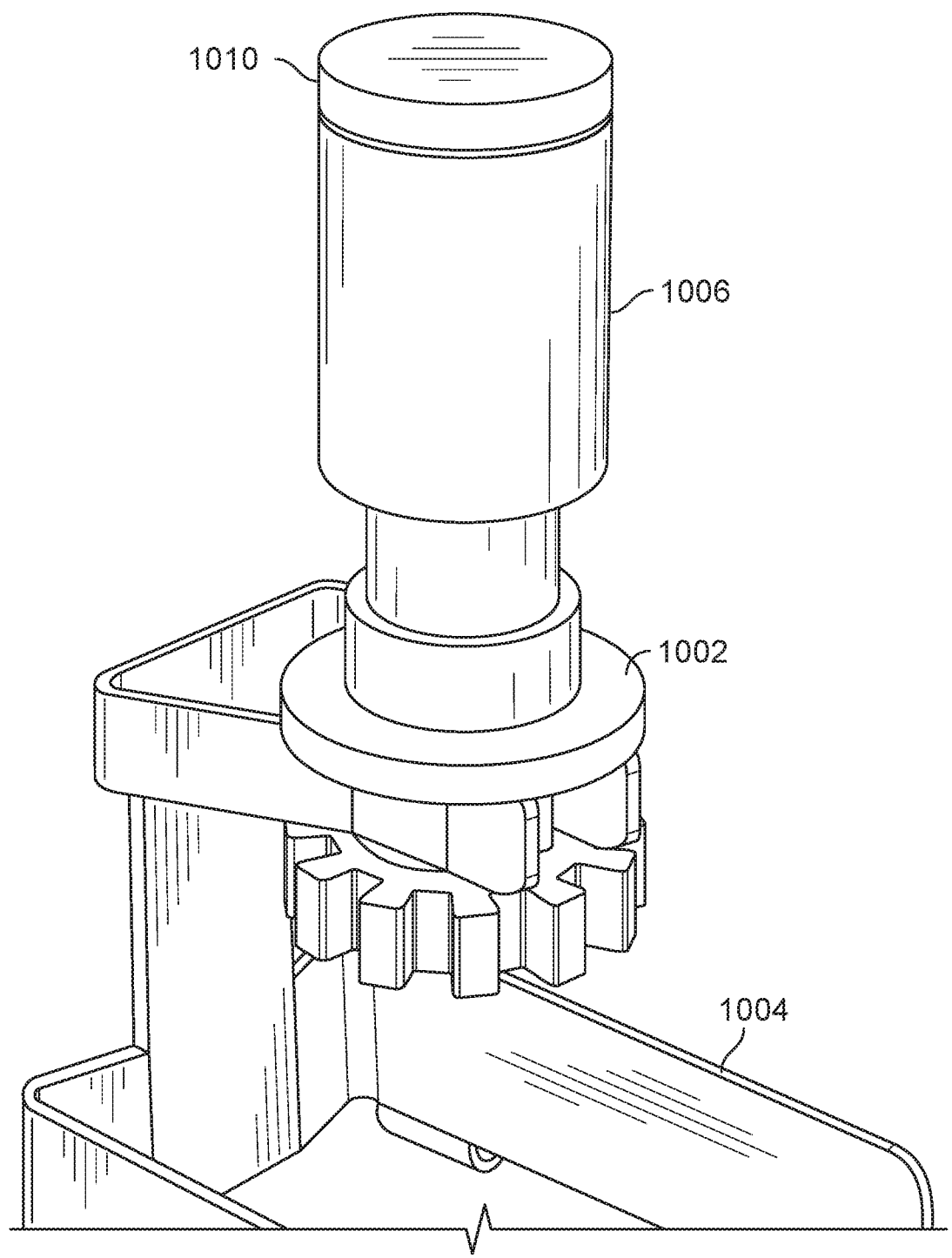

At 908, a well-shaping mold cap is placed on the forming mold. The well-shaping mold cap creates a well in the molding material where a specimen can be placed. The shown well-shaping mold cap 1010 includes a solid cylindrical extension that is smaller in diameter than the diameter of the interior of the forming mold and when the well-shaping mold cap is capped on the forming mold, the extension of the well-shaping mold cap is inserted inside the forming mold to occupy and form the space of the specimen well surrounded by the molding material. For example, the cap has a pin extension that will form a pit at the top of the molding material when the molding material solidifies around the pin. The diameter of the cylinder extension/pin is such to host a biological specimen together with the specimen's natural medium. The well-shaping mold cap is placed prior to solidification of the molding material. An example of capping the forming mold with well-shaping mold cap 1010 is shown in FIG. 10D. An example illustration after capping with well-shaping mold cap 1010 is shown in FIG. 10E.

At 910, the molding material is allowed to solidify. For example, at room temperature, a Phytagel molding material solidifies in approximately five minutes and the amount of time required for solidification is allowed to pass.

Figure 10F:
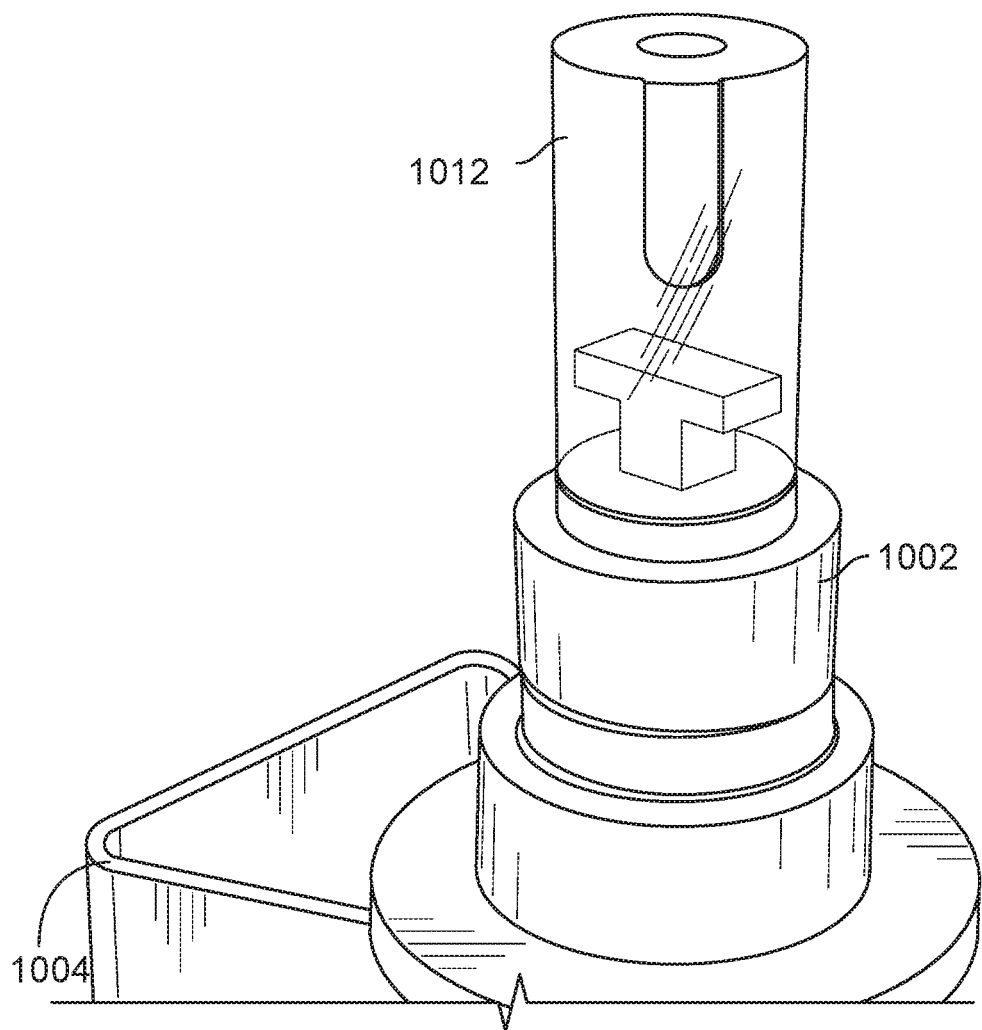

At 912, the shaping molds are removed. For example, the forming mold and the mold cap are removed. The result is a solidified molding material in the shape of a cylinder with an open top cylindrical interior well. FIG. 10F illustrates an example of the resulting solidified molding material 1012.

Figure 10G:
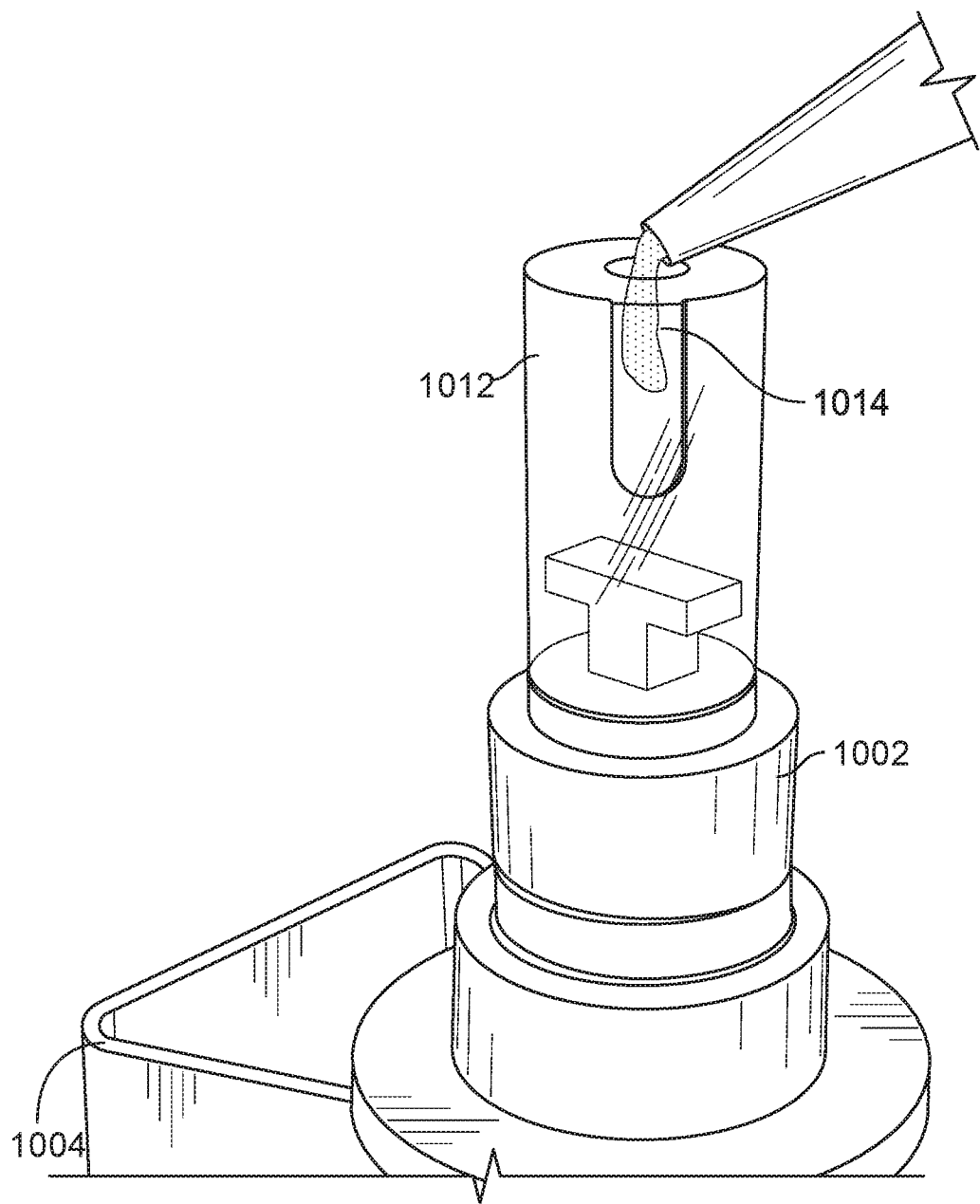

At 914, a specimen is inserted in the well of the solidified molding material along with an appropriate medium. For example, a biological specimen and solution (e.g., solution that is natural, transparent, saline, etc.) are placed inside the well. An example of the placement of specimen 1014 suspended in the medium is illustrated in FIG. 10G.

Figure 10H:
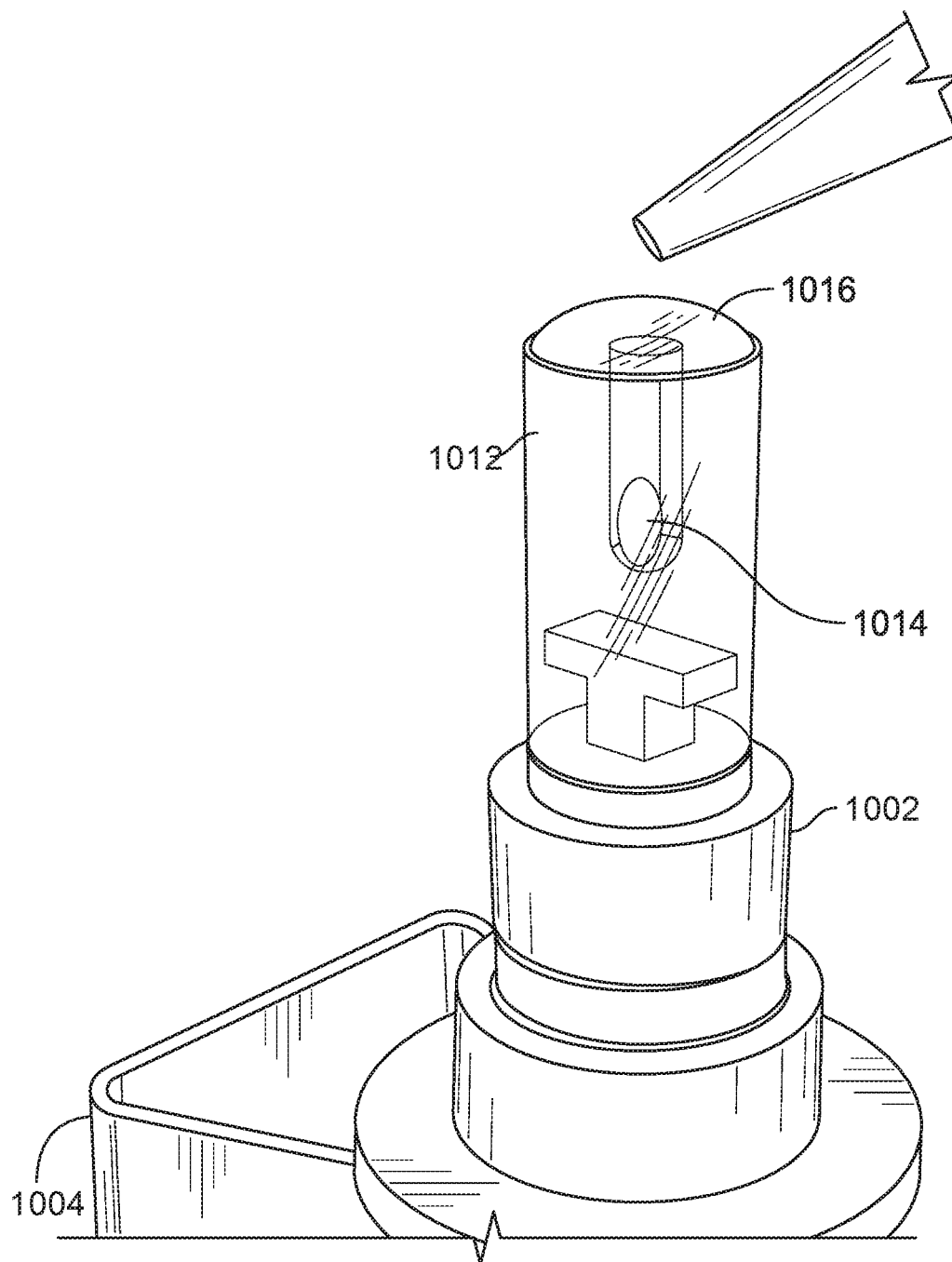

At 916, the well with the specimen is sealed. For example, the well is sealed with a substantially transparent material. The sealing material may be initially in a liquid or gel consistency that solidifies after a period of time. Examples of the sealing material include agar, agarose, gellan gum, or another gelling agent. For example, a low melting agarose gel drop (e.g., ~1%) is used as the sealing material and is placed on the opening of the well with the specimen. An example of sealing the well with sealing material 1016 is illustrated in FIG. 10H.

At 918, the sealing material is allowed to settle and solidify. For example, the agarose drop is allowed to settle and solidify for approximately one minute. By sealing the well, a specimen contained in the well does not escape the well even if the well is tipped on its side.

At 920, the specimen holder with the specimen is laid on its side horizontally and placed in a chamber assembly for SPIM imaging. For example, the specimen holder and the T-spike rotary mounting is placed in the chamber of chamber assembly 700 of FIG. 7. The chamber assembly may then be placed on the translation stage of the microscope for SPIM imaging.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for illuminating a microscopy specimen, comprising:
   an illumination source configured to emit a light that travels along an illumination path to illuminate the microscopy specimen placed on an optical detection path of an optical microscope; and
   optical elements in the illumination path and configured to at least in part transform the light from the illumination source into a light sheet illuminating the microscopy specimen;
   wherein the optical elements include an electronically tunable lens configured to vary a focal distance of the electronically tunable lens to dynamically vary a position of a waist of the light sheet illuminating the microscopy specimen; and
   wherein the optical elements include a deflector configured to vertically move the light sheet to illuminate the microscopy specimen at different horizontal planes; and
   wherein the optical detection path includes a second electronically tunable lens configured to automatically vary a focal distance of the second electronically tunable lens.

2. The system of claim 1, wherein the deflector includes an oscillating mirror that oscillates about a central rotational axis.

3. The system of claim 1, wherein the focal distance of the electronically tunable lens is automatically swept across a range of focal distance values.

4. The system of claim 1, wherein the electronically tunable lens is adjustable in a range that includes both positive and negative diopter values.

5. The system of claim 1, wherein the optical elements include a second deflector configured to horizontally move a direction with which beam components extending within the light sheet are directed to the microscopy specimen.

6. The system of claim 5, wherein the second deflector includes an oscillating mirror that vibrates about a central rotational axis.

7. The system of claim 1, wherein the optical elements include a collimator and one or more diaphragms configured to adjust field and/or or angular aperture stops associated with the light sheet.

8. The system of claim 1, wherein the optical elements include an aspherical optical element configured to at least in part generate a light bundle with an elliptic cross section.

9. The system of claim 1, wherein the optical detection path includes a detector configured to detect a fluorescent light emitted by the microscopy specimen.

10. The system of claim 1, wherein the focal distance of the second electronically tunable lens is automatically synchronized with automatically varying a vertical location of the light sheet illuminating the microscopy specimen.

11. The system of claim 1, wherein the optical elements include a group of optical relay lenses and an optical objective that directs the light sheet to the microscopy specimen, and the electronically tunable lens is positioned in the illumination path between the group of optical relay lenses and the optical objective.

12. The system of claim 1, wherein the optical elements include a group of optical relay lenses, and the electronically tunable lens is positioned in the illumination path between the group of optical relay lenses and the deflector.

13. The system of claim 1, wherein the optical elements include an aspherical optical element, and the electronically tunable lens is positioned in the illumination path between the aspherical optical element and the deflector.

14. The system of claim 1, further comprising a motorized stage configured to move and rotate the microscopy specimen with respect to the light sheet.

15. The system of claim 1, wherein scanning lines of a rolling shutter of a detector in the optical detection path are synchronized with a varying position of the waist of the light sheet.

16. The system of claim 1, further comprising a second illumination source configured to emit a different light that travels along a second illumination path to illuminate the microscopy specimen placed on the optical detection path of the optical microscope.

17. A system for illuminating a microscopy specimen, comprising:
- an illumination source configured to emit a light that travels along an illumination path to illuminate the microscopy specimen placed on an optical detection path of an optical microscope; and
- optical elements in the illumination path and configured to at least in part transform the light from the illumination source into a light sheet illuminating the microscopy specimen;
- wherein the optical elements include an electronically tunable lens configured to vary a focal distance of the electronically tunable lens to dynamically vary a position of a waist of the light sheet illuminating the microscopy specimen; and
- wherein the optical elements include a deflector configured to vertically move the light sheet to illuminate the microscopy specimen at different horizontal planes; and
- wherein the optical elements include an aspherical optical element, and the electronically tunable lens is positioned in the illumination path between the aspherical optical element and the deflector.

18. The system of claim 17, wherein the optical elements include a second deflector configured to horizontally move a direction with which beam components extending within the light sheet are directed to the microscopy specimen.

19. The system of claim 18, wherein the second deflector includes an oscillating mirror that vibrates about a central rotational axis.

20. The system of claim 17, wherein scanning lines of a rolling shutter of a detector in the optical detection path are synchronized with a varying position of the waist of the light sheet.

* * * * *

UNITED STATES PATENT AND TRADEMARK OFFICE
CERTIFICATE OF CORRECTION

PATENT NO. : 10,768,400 B2
APPLICATION NO. : 15/944485
DATED : September 8, 2020
INVENTOR(S) : Igor Lyuboshenko It is certified that error appears in the above-identified patent and that said Letters Patent is hereby corrected as shown below:

In the Drawings

In Drawing sheet(s) 20 of 28, figure 9, delete "620" of " 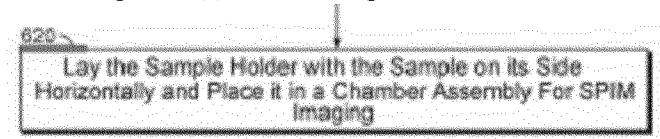 " and insert --920--, therefor.

In the Claims

In Column 16, Line(s) 33, Claim 7, delete "and/or or" and insert --or--, therefor.

Signed and Sealed this
Twenty-ninth Day of June, 2021

Drew Hirshfeld
*Performing the Functions and Duties of the
Under Secretary of Commerce for Intellectual Property and
Director of the United States Patent and Trademark Office*